(12) United States Patent
Sergeev

(10) Patent No.: US 8,504,014 B2
(45) Date of Patent: Aug. 6, 2013

(54) METHOD FOR ASSOCIATING COMMUNICATIONS DEVICES

(76) Inventor: Alexander Sergeev, San Leandro, CA (US)

( * ) Notice: Subject to any disclaimer, the term of this patent is extended or adjusted under 35 U.S.C. 154(b) by 393 days.

(21) Appl. No.: 12/777,257

(22) Filed: May 10, 2010

(65) Prior Publication Data

US 2011/0275357 A1 Nov. 10, 2011

(51) Int. Cl.
*H04M 3/00* (2006.01)
*G06F 3/02* (2006.01)
*H04L 12/56* (2006.01)

(52) U.S. Cl.
USPC ............ 455/425; 455/418; 345/169; 370/392

(58) Field of Classification Search
USPC .... 455/412.1–415, 422.1–425; 370/389–392
See application file for complete search history.

(56) References Cited

U.S. PATENT DOCUMENTS 5,818,836 A * 10/1998 DuVal ........................... 370/389
2010/0257251 A1* 10/2010 Mooring et al. .............. 709/216

FOREIGN PATENT DOCUMENTS

EP 2395446 A1 * 12/2011

* cited by examiner

*Primary Examiner* — Kashif Siddiqui
(74) *Attorney, Agent, or Firm* — Patrick Reilly

(57) ABSTRACT

Methods and systems for enabling at least two parties to create a potential for associating communications devices are provided. In a first case, a first communications device has a first network address and a second communications device has a second network address. A server receives a first input pattern from the first communications device, a second input pattern by the server from the second communications device whereby the second input pattern may be created by the same human operator. Alternatively, the input patterns may be digitized representations of ambient or environmental sound or optical signals. When the server determines that the first input pattern substantively matches the second input pattern, the server issues a reference number and associates the first network address and the second network address with the reference number. The server may then communicatively connect the first device and the second device upon receipt of the reference number.

20 Claims, 25 Drawing Sheets

METHOD FOR ASSOCIATING COMMUNICATIONS DEVICES

FIELD OF THE INVENTION

The present invention relates generally to electronic communications methods and systems, and more particularly to establishing a potential for associating network addresses of communications-enabled electronic devices.

BACKGROUND OF THE INVENTION

The use of electronically mediated social networks enable consumers to initiate, nurture and maintain numerous personal and professional relationships. Furthermore, a certain user features for maintaining anonymity and degrees of privacy are provided in aspects of certain social network services, such as Facebook.com and MySpace.com. Yet the risk inherent in the process of deciding whether to enable a communications session with an unknown, or little known, person is poorly addressed by the prior art.

In addition, the ubiquity of mobile electronic communications devices enable two previously unconnected persons to each conveniently and freely engage in conversations and make personal disclosures according to their unique sensibilities. In one common social situation, two newly acquainted people may be interested in learning more about each other, but may not wish to immediately disclose their personal identities. Cell phones and other electronics communications devices are used in the prior art to enable anonymous conversational sessions but fail to provide unfamiliar individuals with a communications modality that can optimally support extended, anonymous and quickly established connectivity.

There is therefore a long-felt need to provide systems and techniques that enable two or more devices to be associated with for later enablement of communications wherein a user may associate the two more devices while maintaining anonymity and/or the user may avoid needing to submit a password to initiate or maintain a communications connectivity between or among the two or more devices.

SUMMARY OF THE INVENTION

This and other objects of the present invention are made obvious in light of this disclosure, wherein methods, systems and computer-readable media for associating two network addresses and enabling communications sessions between the devices addressable by each network address are provided.

In a first case, a first communications device has a first network address and a second communications device has a second network address. A server receives a first input pattern from the first communications device, a second input pattern by the server from the second communications device whereby the second input pattern may be created by the same human operator. Alternatively, the input patterns may be digitized representations of, ambient or environmental sound or optical signals, or provided by input to the first communications and/or the second communications device. When the server determines that the first input pattern substantively matches the second input pattern, the server issues a reference number and associates the first network address and the second network address with the reference number. The server may then communicatively connect the first device and the second device upon receipt of the reference number.

According to a first additional aspect of the method of the present invention, a user of a first cellular telephone inputs a sequential pattern of key depressions of the telephone keypad, and further inputs the same, or substantively similar, sequential pattern by means of a keypad or other input device of a second electronic network communications-enabled device, such as a second cellular telephone. A communications server connected to an electronic communications network that receives both the input from the first cellular telephone and the input from the second device, e.g., a second cellular telephone, compares the patterns received from each device. When the two patterns are sufficiently matched, the server initiates a communications record, and transmits a record identifier to the first telephone, the second device, and/or another electronic device that is associated with the first telephone or second device, or a participant in the transmission of either pattern. The record identifier may then be used by the receiving party to initiate a communications request to the other party, wherein the record identifier does not signify the identity of either participant of the initial pattern transmissions.

In another aspect of the method of the present invention, the user may observe a visual signal, feel a tactile stimulus, and/or hear an auditory signal, e.g., a musical performance, and attempt to transmit a sequential pattern that matches the observed signal or stimulus to the communications server. The visual signal may be or comprise a flashing or intermediate light, and the tactile stimulus may be a timed series of applications of pressure against the user's skin.

In yet another aspect of the method of the present invention, the identity of one party is disclosed to a second party, while the second party maintains anonymity.

In still another aspect of the method of the present invention, the user initiates a communications channel with an automated system or process rather than with another human being.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 7,418,503 titled "Anonymous location service for wireless networks"; U.S. Pat. No. 7,412,234 titled "System and method for using location information to execute an action"; U.S. Pat. No. 7,383,052 titled "System and method for using location information to execute an action"; U.S. Pat. No. 7,245,925 titled "System and method for using location information to execute an action"; U.S. Pat. No. 7,218,921 titled "Method and system for inviting and creating accounts for prospective users of an instant messaging system"; U.S. Pat. No. 7,181,225 titled "System and method for surveying wireless device users by location"; U.S. Pat. No. 7,110,749 titled "Identity blocking service from a wireless service provider"; U.S. Pat. No. 7,069,319 titled "Anonymous location service for wireless networks"; U.S. Pat. No. 7,000,019 titled "Establishment of a deferred network communication session"; U.S. Pat. No. 6,779,118 titled "User specific automatic data redirection system"; U.S. Pat. No. 6,744,869 titled "Method and system for one party to pass a calling invitation to another party"; and U.S. Pat. No. 6,577,874 titled "Methods and systems for providing temporary identification numbers for mobile terminals.

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention, may be better understood with reference to the accompanying specification, wherein.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
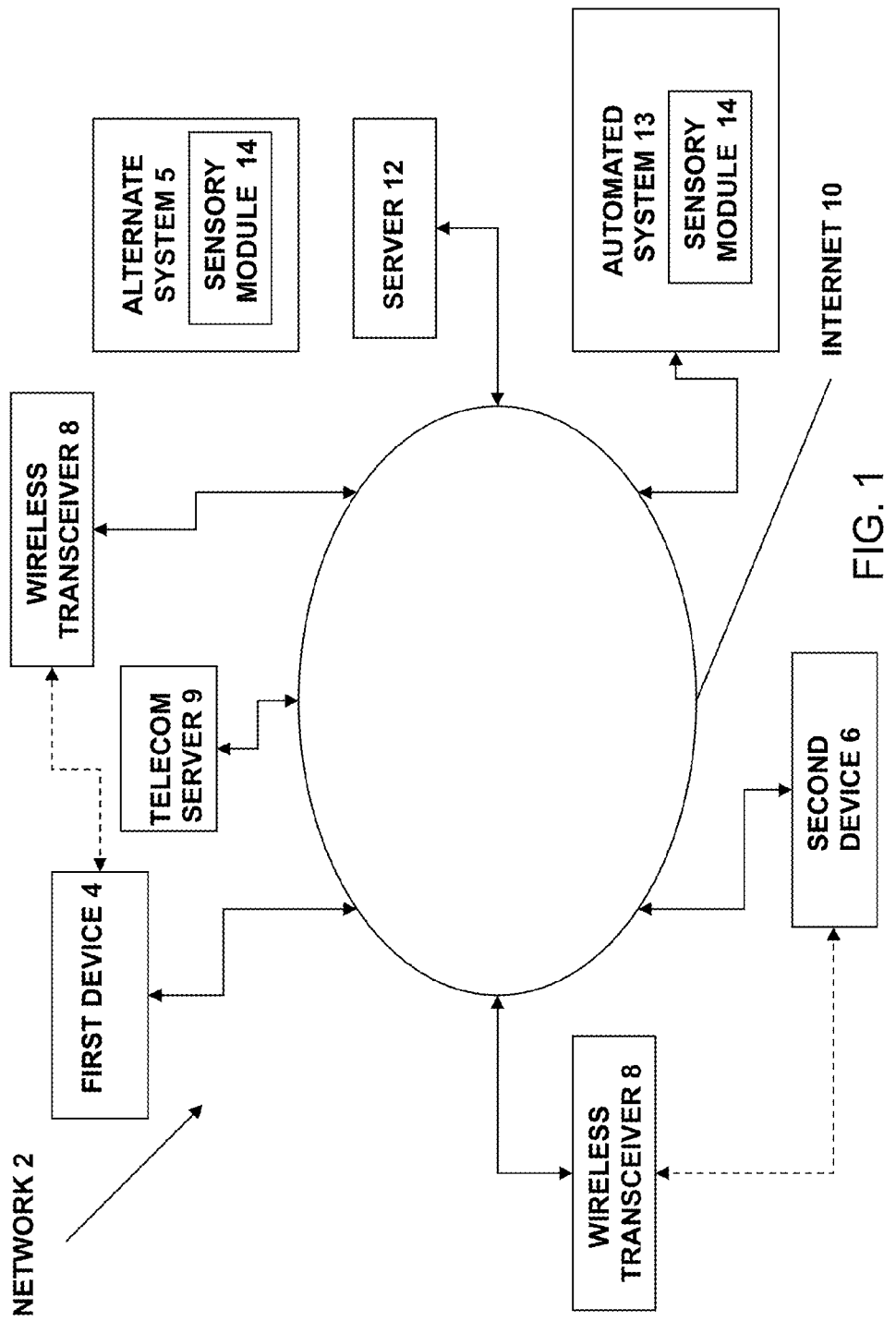
FIG. 1 is a schematic of an electronics communications network including a first communications device, a second communications device and a communications server.

Referring now generally to the Figures and particularly to FIG. 1, FIG. 1 is an electronics communications network 2 that bi-directionally communicatively couples a first communications device 4 and a second communications device 6. The first communications device 4 and the second communications device 6 may be enabled for Voice-over Internet Protocol (or, "VoIP") communications, and optionally for transmission of video, graphic and/or text data by a hardwired or landline connection and/or by radio wave transmission, e.g., by wireless telephony modalities. In certain applications of the method of the present invention, a third party VoIP service, such as SKYPE™ VoIP service may be employed to enable voice and optionally video, text and/or text data communications.

An alternate system 5 is not bi-directionally communicatively coupled with the network 2, but generates sensory emissions, e.g., light pulses, music, or vibrations, that are observable by a user of either the first communications device 4 and/or a second party.

The electronics communications network 2 (hereinafter "the network" 2) may be or comprise a telephony network. The network may include one or more wireless transmission transceivers 8, telecom servers 9 and/or optionally comprise the Internet 10. One or more telecom servers 9, a communications server 12, and/or an automated system 13 of the network 2 may be or comprise a wireless communications switch or router that is bi-directionally communicatively coupled with the first communications device 4, the second communications device 6 and/or the wireless transceivers 8 by means of the network 2 and/or the Internet 10.

The automated sensory system 13 is bi-directionally communicatively coupled with the network 2 and includes a sensory pattern module 14 that presents an observable output to a user of the first communications device 4 (or "first party") and/or the second communications device 6 (or "second party"). The sensory emission or output of the sensory pattern module 14 may be visible, audible and/or tactilely delivered to a first party and/or the second communications device 6 in alternative, optional or additional aspects of the method of the present invention.

The first communications device 4 and the second communications device 6 may separately be or comprise an electronic computer system, an information appliance configured for wireless Internet-enabled communication, a television set-top box, and/or a wireless communications capable communications device, such as (a.) an iPhone™ cellular telephone as marketed by Apple Computer of Cupertino, Calif.; (b.) a wireless communications enabled SUN SPARC-SERVER™ computer server marketed by Sun Microsystems of Santa Clara, Calif. running LINUX™ or UNIX™ operating system; (c.) a wireless communications enabled personal computer configured for running WINDOWS XP™ or VISTA™ operating system marketed by Microsoft Corporation of Redmond, Wash.; (d.) a PowerBook G4™ personal computer as marketed by Apple Computer of Cupertino, Calif.; (e.) a VAIO FS8900™ notebook computer marketed by Sony Corporation of America, of New York City, N.Y.; or (f.) a personal digital assistant enabled for wireless communications.

Figure 2:
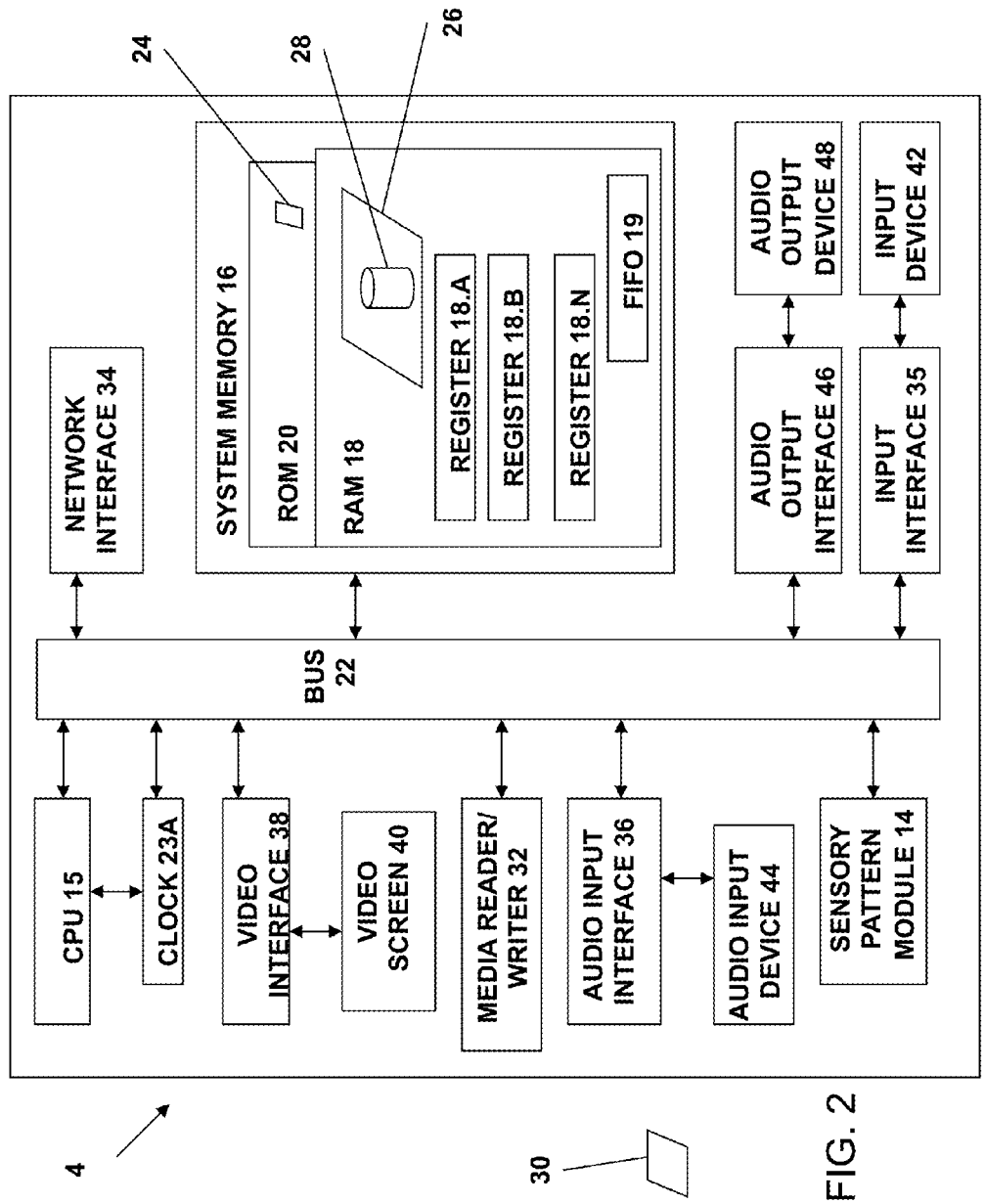
FIG. 2 is a schematic diagram of the first communications device of FIG. 1.

FIG. 2 is a schematic diagram of the first communications device 4 of FIG. 1. It is understood that each and every element of the first communications device 4 may be comprised within the second communications device 6, the telecom servers 9, the communications server 12, the automatic system 13, and/or the sensory pattern module 14. The computer architecture shown in FIG. 2 illustrates the first communications device 4 and the second communications device 6, including a central processing unit 15 (hereinafter, "CPU" 15), a system memory 16 that includes (a.) a random access memory 18 (hereinafter, "RAM"), (b.) a rewriteable first-in-first-out register 19, and (c.) a read-only memory (hereinafter, "ROM") 20. A system bus 22 of the first communications device 4 couples the system memory 16 to the CPU 15. The first communications device 4 and/or the CPU 15 may further comprise a client real time clock 23A that provides clock pulses to the CPU 15, the bus 22, and the other elements of the first device 4 via the bus 22, such as the first-in-first-out register 19 (or "FIFO" 19).

A basic input/output system 24 containing the basic software-encoded instructions and routines that help to transfer information between elements within the first communications device 4, such as during startup, is stored in the ROM 20. The first communications device 4 further includes a system software 26 and a database management system 28 (hereinafter "DBMS" 28) stored in the system memory 16 and/or a computer-readable medium 30.

It is understood that the DBMS 28 may be or comprise a contact software management software as provided in an iPhone™ and/or more extensive database software products, such as Outlook™ contact management software as marketed by Microsoft Corporation of Redmond, Wash., Excel electronic spreadsheet software as marketed by Microsoft Corporation of Redmond, Wash.

Alternatively or additionally the RAM 18 of the first communications device 4 and/or the second communications device may be or comprise a plurality of registers 18.A-18.N that are used to store and access information provided from the communications server 12 optionally in combination with the FIFO 19.

A media writer/reader 34 is bi-directionally communicatively coupled to the CPU 15 through the bus 22. The media writer/reader 32 and the associated computer-readable media 30 are selected and configure to provide non-volatile storage for the first communications device 4. Although the description of computer-readable media 30 contained herein refers to a mass storage device, such as a hard disk or CD-ROM drive, it should be appreciated by those skilled in the art that computer-readable media can be any available media that can be accessed by the first communications device 4.

By way of example, and not limitation, computer-readable media 30 may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the first communications device 4.

The computer-readable medium 30 may comprise machine-readable instructions which when executed by the first communications device 4 to cause the first communications device 4 to perform one or more steps as described in the Figures and enabled by the present disclosure.

The bus 22 further bi-directionally communicatively couples a network interface 34, a user input interface 35, a user audio input interface 36, and a video screen interface 38 with the CPU 15 and the system memory 16.

In certain aspects of the method of the present invention, the first device 4 may be a digital cellular telephone, e.g., an iPhone, and the user input interface 35 may be a digital telephone keypad 35A that is touch sensitive and/or heat sensitive.

The network interface 34 couples the first communications device 4 to the directionally communicatively couple the first communications device with a wireless transceiver 8 of a wireless telephony network of the network 2, and/or with a wireless router 8 of the Internet of the network 2. Alternatively or additionally the network interface 34 may be configured to bi-directionally communicate with the network 2 via a landline telephone.

The video screen interface 38 directs visual presentations of data on a visual display screen 40 and bi-directionally communicatively couples the visual display screen 40 with the CPU 15 via the communications bus 14.

The user input interface 35 couples a user input device 42, such as an electronic keyboard, keypad, a computer mouse, a computer trackball, or a computer mouse pad, with the CPU 15 via the communications bus 22 and enables the user to input icon selections, commands and data to the first communications device 4. The icon selections may be chosen from images presented on the visual display screen 40.

The audio input interface 36 couples a user audio input device 44, such as an audio microphone, with the CPU 15 via the communications bus 22 and enables the user to input vocal input that communicates icon selections, commands and data to the first communications device 4, and/or digitized representations of verbal expressions. The digitized representations of verbal expressions may be transmitted via the network interface 34 to enable VoIP communications with the second communications device 6 and thereby with the second party.

An audio output interface 46 communicatively coupled with the communications bus 22 receives digitized verbal information, such as VoIP messages, from the network 2 via network interface 34 and drives the audio output device 48 to audibly output verbal message derived from the digitized verbal communications.

Figure 3:
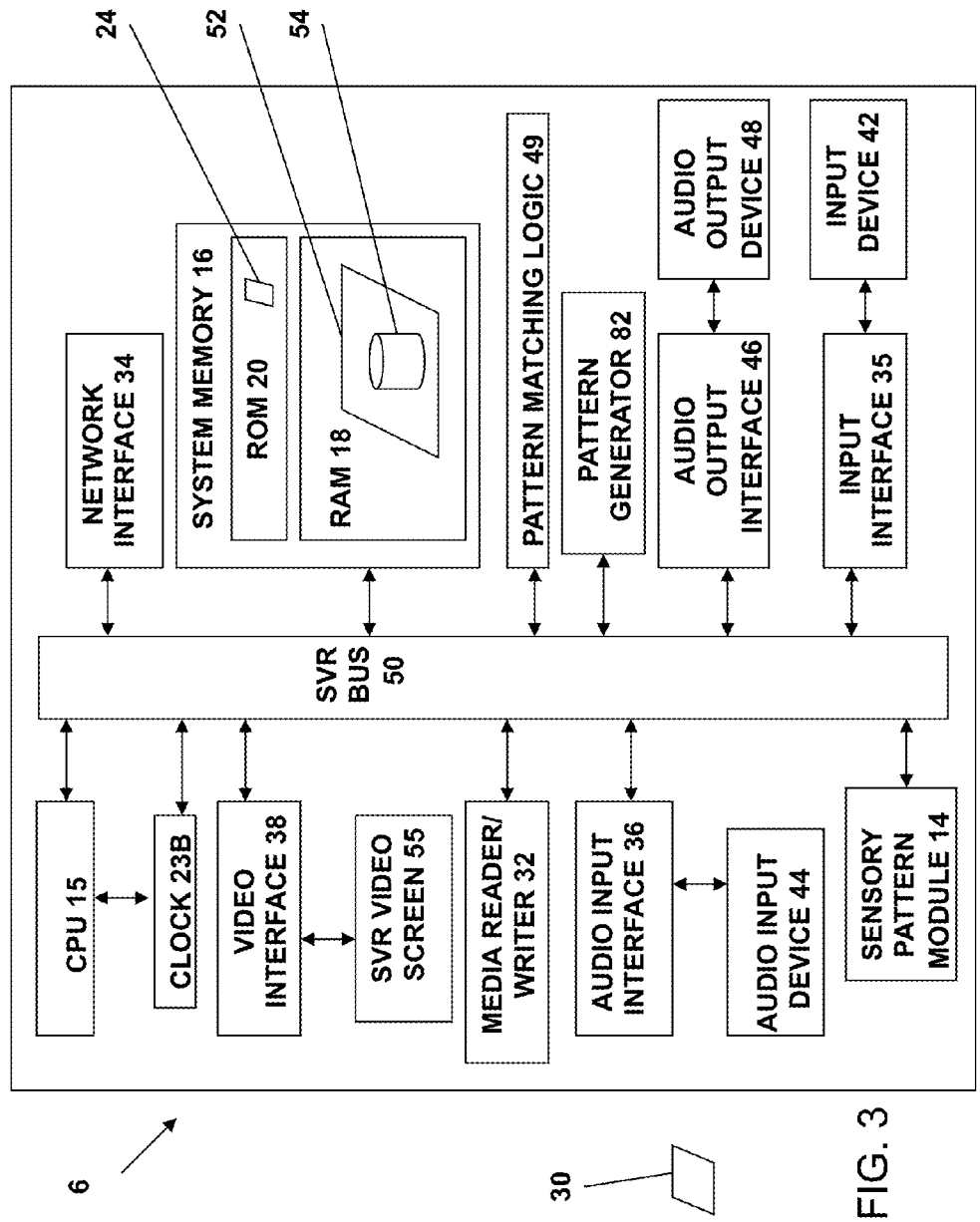
FIG. 3 is a schematic diagram of the communications server of FIG. 1.

FIG. 3 is a schematic diagram of the communications server 12 of FIG. 1. The communications serer 12, or server 12, may be or comprise an electronic computer system configured for bi-directional communications with the network 2, such as (a.) a SUN SPARCSERVER™ computer server marketed by Sun Microsystems of Santa Clara, Calif. running LINUX™ or UNIX™ operating system; (b.) a server or personal computer configured for running WINDOWS XP™ or VISTA™ operating system marketed by Microsoft Corporation of Redmond, Wash.; (c.) a PowerBook G4™ personal computer as marketed by Apple Computer of Cupertino, Calif.; (d.) an information appliance configured for Internet-enabled communication; and (e.) a wireless communications-enabled communications device.

The computer architecture shown in FIG. 3 illustrates the communications server 12, including the CPU 15, pattern matching logic 49, the system memory 16, including the RAM 18 and the ROM 20, and a server communications system bus 50 (hereinafter, "SVR bus" 50) that couples the system memory 16 to the CPU 15. The basic input/output system 24 containing the basic software-encoded instructions and routines that help to transfer information between elements within the first communications device 4, such as during startup, is stored in the ROM 20. The first communications device 4 further includes a server system software 52 and a database management system 54 (hereinafter "WS DBMS" 54) stored in the system memory 16 and/or the computer-readable medium 30.

Referring now generally to the Figures and particularly to FIGS. 3, 8, 10, 12, 14, 15, wherein pattern matching logic 49 receives patterns of input signals from the network 2 and determines whether two or more signals P.1-P.N match a first signal pattern P.0 within a prespecified degree of mathematically derived similarity W.

As described below regarding FIGS. 6 and 7, when one or more signal input patterns P.1-P.N received from the network 2, and/or the first communications device 4 and/or the second communications device 6, the server 12 creates a communications record R.1-R.N and populates the communications record R.1-R.N with two or more address data CALL.1-CALL.2, wherein a first party address data CALL.1 is a communications address for a device 4 and 6 or the automated system 13 associated with the first pattern P.0, and the a second address CALL.2 is a communications address for a device 4 and 6 or the automated system 13 associated with another pattern P.1-P.N that sufficiently matches the first pattern P.0. The first party address data CALL.1 and the second party address data CALL.2 may each be or comprise a telephone number, an email address, a universal resource locator of the Internet, a network address of a computer network, and/or a website address.

The media writer/reader 32 is bi-directionally communicatively coupled to the CPU 15 through the SVR bus 50. The media writer/reader 32 and the associated computer-readable media 30 are selected and configure to provide non-volatile storage for the second communications device 6. Although the description of computer-readable media 30 contained herein refers to a mass storage device, such as a hard disk or CD-ROM drive, it should be appreciated by those skilled in the art that computer-readable media can be any available media that can be accessed by the first communications device 4.

The computer-readable medium 30 may comprise machine-readable instructions which when executed by the second communications device 6 to cause the second communications device 6 to perform one or more steps as described in the Figures and enabled by the present disclosure.

The SVR bus 50 further bi-directionally communicatively couples the network interface 32, the audio input interface 34, the audio input interface 36, and the video screen interface 38 with the CPU 15 and the system memory 16. The video screen interface 38 directs visual presentations of data on a server visual display screen 55 (hereinafter, "SVR display" 55) for access by an operator and bi-directionally communicatively couples the SVR display 55 with the CPU 15 via the SVR communications bus 50.

The input interface 34 couples the input device 42, such as an electronic keyboard, an electronic keypad, a computer mouse, a computer trackball, or a computer mouse pad, with the CPU 15 via the communications bus 14 and enables the operator to input icon selections, commands and data to the first communications device 4. The icon selections may be chosen by the operator from images presented on the server display screen 55.

The audio input interface 36 couples the audio input device 44, such as an audio microphone, with the CPU 15 via the communications bus 22 and enables the operator to input vocal input that communicates icon selections, commands and data to the second communications device 6, and/or digitized representations of verbal expressions. The digitized representations of verbal expressions may be transmitted via the network interface 32 to enable VoIP communications with the first communications device 4.

The audio output interface 34 communicatively coupled with the WS bus 50 receives digitized verbal information, such as VoIP messages, from the network 2 via network interface 32 and drives the audio output device 48 to audibly output verbal message derived from the digitized verbal communications for acoustic perception by the operator.

It is understood that the VoIP server 8 may include one or more of the elements or aspects 14-54 of the first communications device 4 and/or the second communications device 6 and as further described below.

Figure 4:
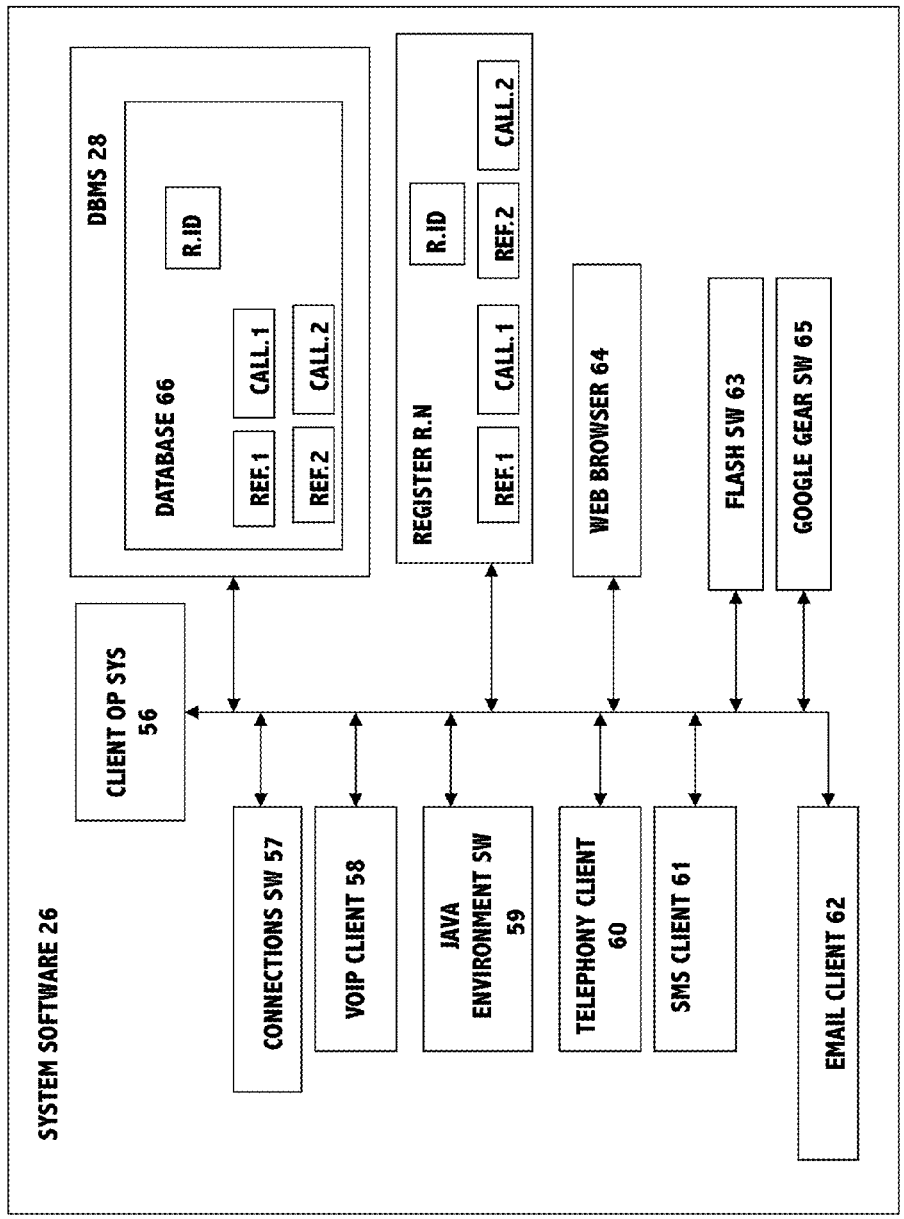
FIG. 4 is an illustration of a system software of the first communications device of FIGS. 1 and 2.

FIG. 4 is an illustration the system software 26 of the first communications device 4. A client operating system 56 enables a connections software module 57 to allow a first party and/or the second communications device 6 to establish an anonymous communications session, and as discussed herein according to the method of the present invention. The client operating system 56 further enables VoIP client software 58 to initiate and support communications via the network 2 and in accordance with prior art voice over Internet techniques and systems.

A Java Runtime Environment™ software modules 59 enable the first communications device 4 and/or the second communications device 6 to accept instructions and data in a form of software-encoded computer intermediate language elements, such as Java™ byte code received, from the server 12 or the network 2 and execute the received software-encoded instructions. Java Runtime Environment and Java are trademarks of Sun Microsystems of Santa Clara, Calif.

The client operating system 56 alternatively or additionally enables a telephony client software 60 to initiate and support communications via the network 2 and in accordance with prior art wireless and/or landline techniques and systems. The client operating system 56 further alternatively or additionally enables a Short Message Service ("SMS") client software 61 to initiate and support SMS communications via the network 2 and in accordance with prior art wireless and/or landline techniques and systems. SMS is defined herein as the transmission of short text messages to and from a mobile phone, fax machine and/or IP address, wherein the SMS messages are typically no longer than 160 alpha-numeric characters and do not contain image or graphic data. An email client 62 enables the user to originate, format, send and receive text and graphic messages via the network 2, and a FLASH™ graphic animation software module 63 and/or a web browser 64 enables the user to send and receive textual, audio and graphic data vie the network 2. FLASH™ software is a software plug-in marketed by Adobe, Inc. of San Jose, Calif. that enables browsers 64 to play multimedia animations on the first communications device 4 and/or the second communications device 6.

A database 66 of the DBMS 28 stores a record identifier R.ID, the first party address data CALL.1, the second party address data CALL.2, a first user reference REF.1 and/or a second user reference REF.2 of a communications record REC.1-REC.N of the server 12.

It is understood that the system software 26 of the first communications device 4 may be replicated in whole or in part in the second communications device 6.

Alternatively or additionally the RAM 18 of the first communications device 4 and/or the second communications device 6 may be or comprise one or more registers 18.A-18.N that are used to store and access information provided from the server 12, wherein one or more registers 18.A-18.N may contain the record identifier R.ID, the first user reference REF.1 and/or the second user reference REF.2. In this aspect of the method of the present invention the database 66 and the DBMS 28 would not be necessary to store and access information provided from the server 12, such as the record identifier R.ID, the first user reference REF.1 and/or the second user reference REF.2, and the database 66 and the DBMS 28 may be omitted from a configuration of the comprising the first communications device 4 and/or the second communications device 6.

According to an optional aspect of the method of the present invention, connections software module 57 may operate with the web browser 64, the FLASH™ graphic animation software module 63, and/or a Google Gear™ client software 65 to execute one or more of the steps or aspects of the method of the invention as disclosed herein.

Figure 5:
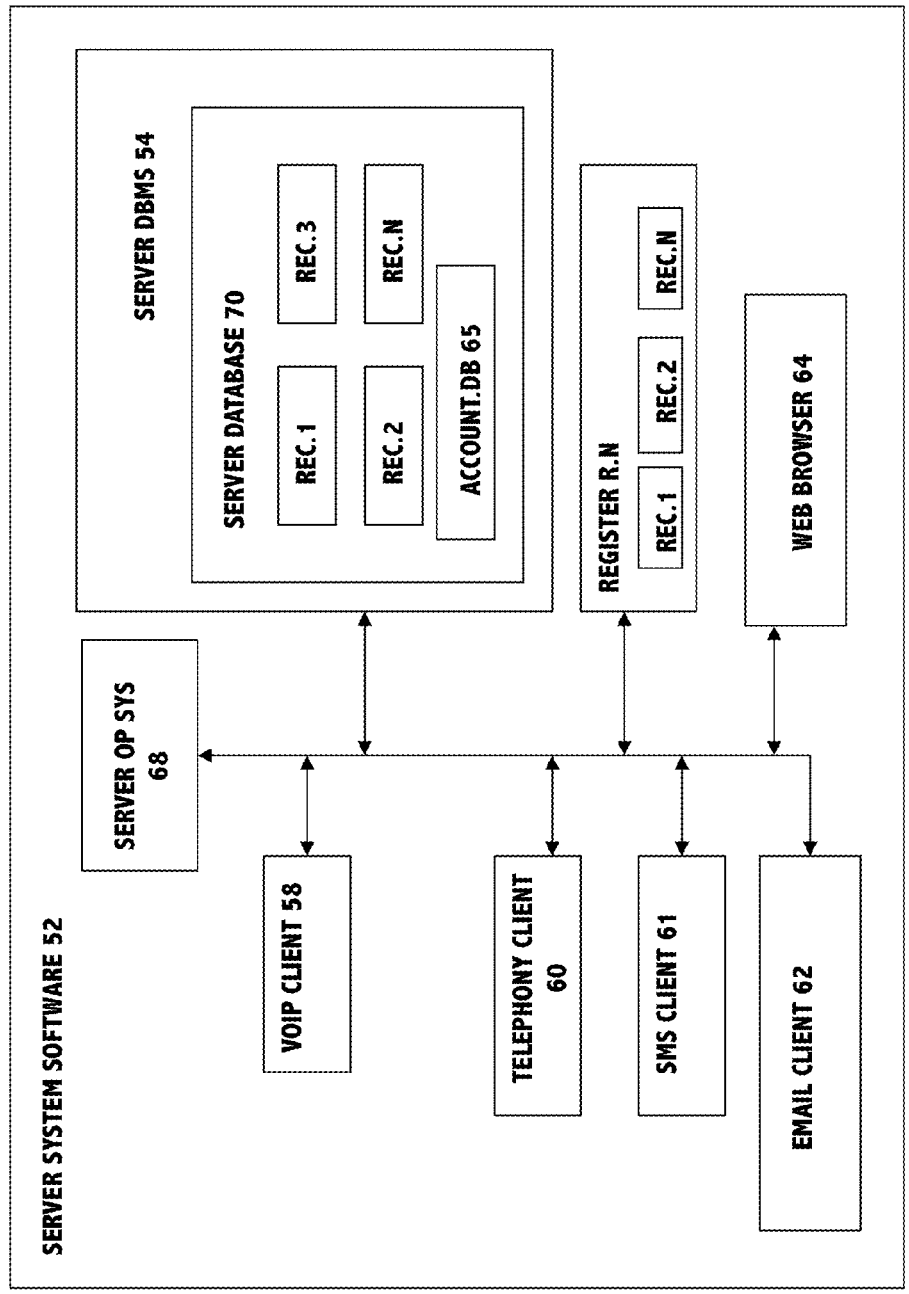
FIG. 5 is an illustration of a system software of the communications server of FIGS. 1 and 3.

FIG. 5 is an illustration of the server system software 52 of the server 12. A server operating system 68 enables the VoIP client software 58 to initiate and support communications via the network 2 and in accordance with prior art voice over Internet techniques and systems. The server operating system 68 alternatively or additionally enables the telephony client software 60 to initiate and support communications via the network 2 and in accordance with prior art wireless and/or landline techniques and systems. The server operating system 52 further alternatively or additionally enables a SMS client software 61 to initiate and support SMS communications via the network 2 and in accordance with prior art wireless and/or landline techniques and systems. The email client 62 enables the server 12 to originate, format, send and receive text and graphic messages via the network 2, and the web browser 64 enables the server 12 to send and receive textual, audio and graphic data vie the network 2. A server database 66 of the server DBMS 54 stores a plurality of communications records REC.1-REC.N. An account database 65 maintains information related to users of the first communication device 4 and the second communications device 6.

It is understood that each and every element of the server 12 may be comprised within one or more alternate systems 5, telecom servers 9, wireless transceivers 8, the automatic system 13 and/or sensory module 14 as presented in FIGS. 1, 3 and 5.

Figure 6:
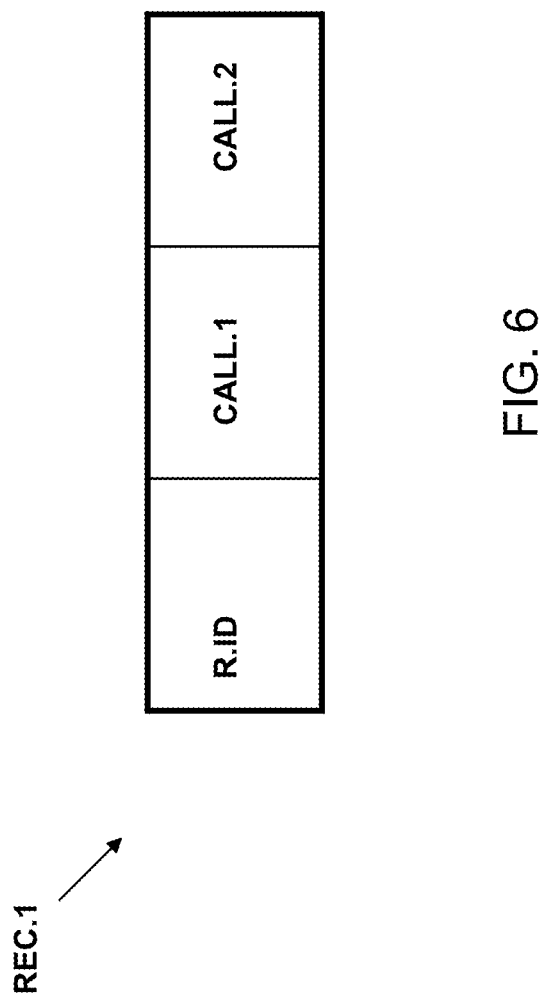
FIG. 6 is a schematic diagram of a representative first communications record of the communications server of FIGS. 1, 3 and 5.

FIG. 6 is a schematic diagram of a representative a first communications record REC.1, comprising the record identifier R.ID, a first party address data CALL.1, and a second party address data CALL.2. The record identifier R.ID uniquely identifies the first communications record REC.1 within the server 12. The record identifier R.ID may be transmitted to the first communications device 4 and enables the first communications device 4 to send a request to initiate a communications session to the second communications device 6. The record identifier R.ID may additionally, alternatively or optionally be transmitted to the second communications device 6 and enables the second communications device 6 to send a request to initiate a communications session to the first communications device 4. The first party address data CALL.1 enables the server 12 to direct electronic messages to the first communications device 4 and to thereby initiate and maintain a communications session between the first communications device 4 and the second communications device 6. The second party address data CALL.2 enables the server 12 to direct electronic messages to the second communications device 6 and to thereby initiate and maintain a communications session between the first communications device 4 and the second communications device 6. As mentioned above, the first party address data CALL.1 and the second party address data CALL.2 may each be or comprise a telephone number, an email address, a universal resource locator of the Internet, a network address of a computer network, and/or a website address.

Figure 7:
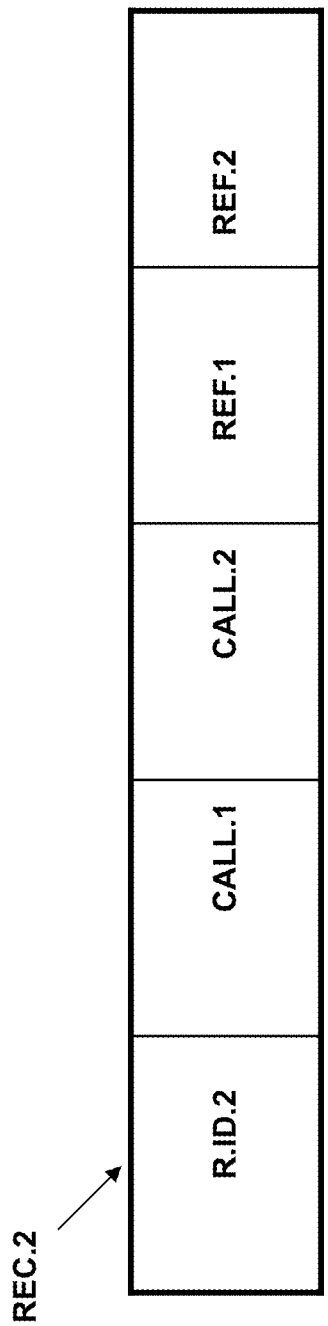
FIG. 7 is a schematic diagram of a representative an alternate communications record.

FIG. 7 is a schematic diagram of a representative an alternate communications record REC.2, comprising a second record identifier R.ID.2, a first party address data CALL.1, and a second party address data CALL.2, a first reference REF.1, and a second reference REF.2. The record identifier R.ID.2 uniquely identifies the first communications record REC.2 within the server 12. The first reference REF.1 may be sent to the first communications device 4 for use by the first user in later attempting to communicate with the second communications device 6 and/or the second party. The second reference REF.2 may be sent to the second communications device 6 for use by the second user in later attempting to communicate with the first communications device 4 and/or the second user of the second communications device 4.

Figure 8:
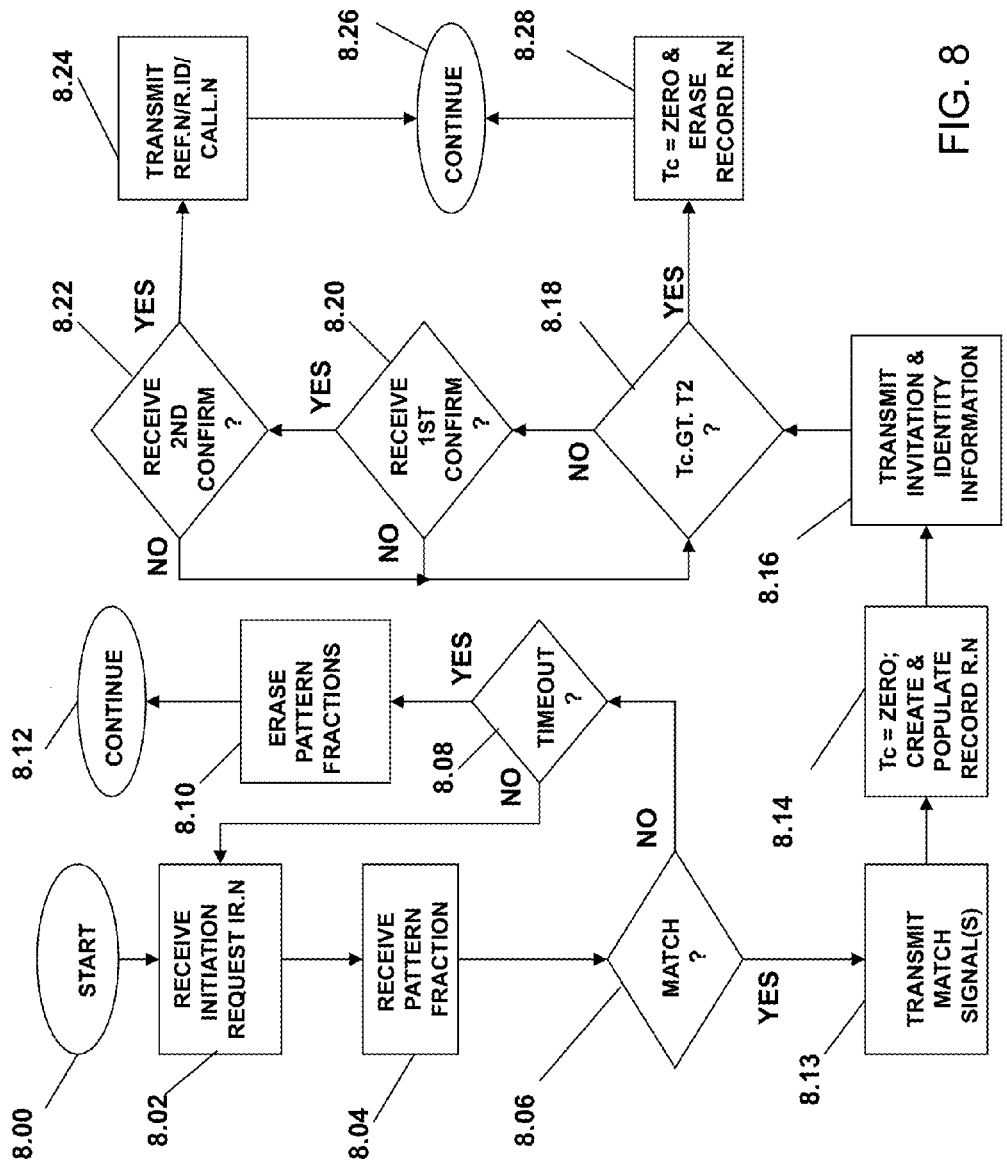
FIG. 8 is a flowchart of a software process executable by the server of FIGS. 1, 3 and 5.
Figure 9:
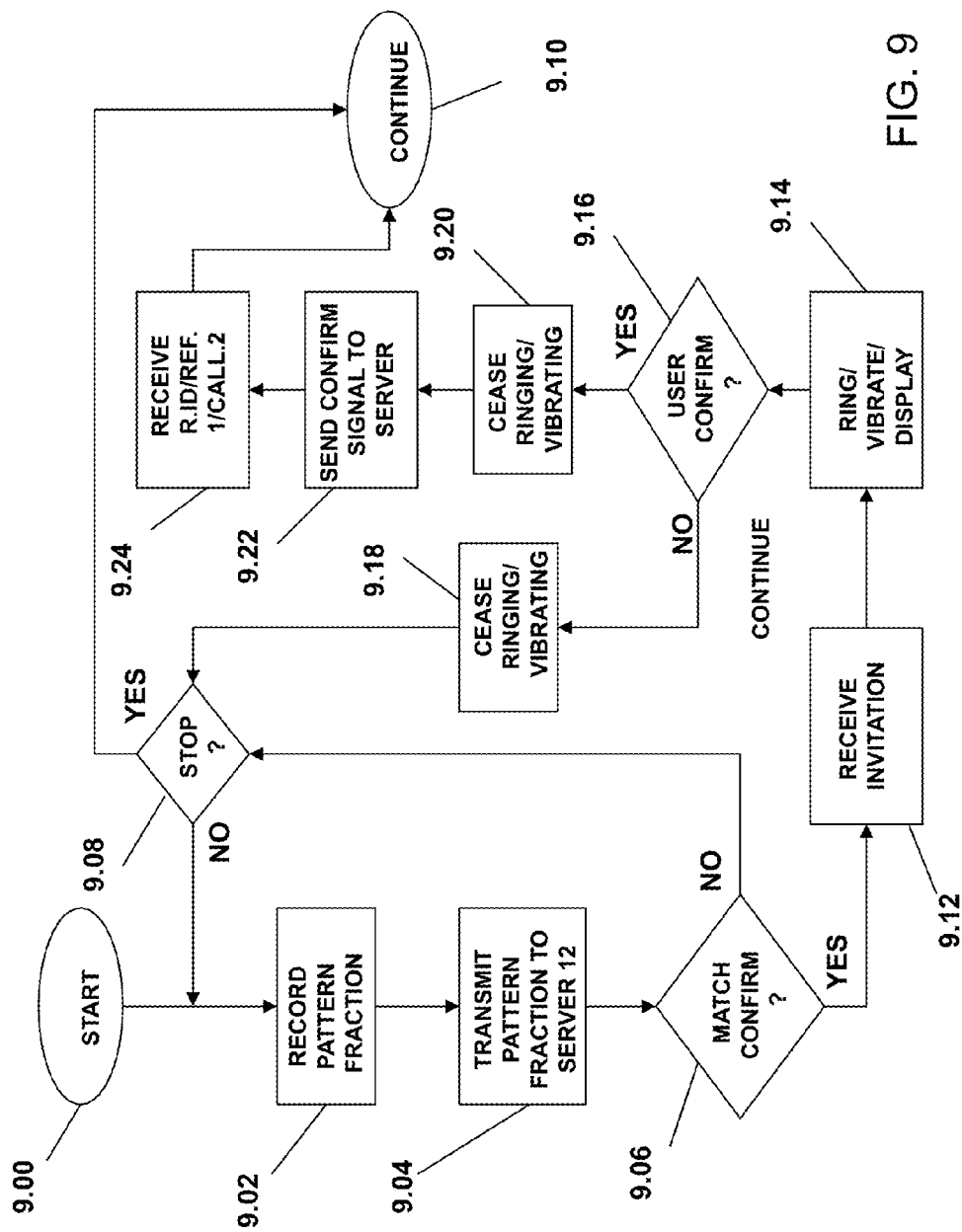
FIG. 9 is a flowchart of a software process executable by the first communications device of FIGS. 1, 2 and 4.
Figure 12:
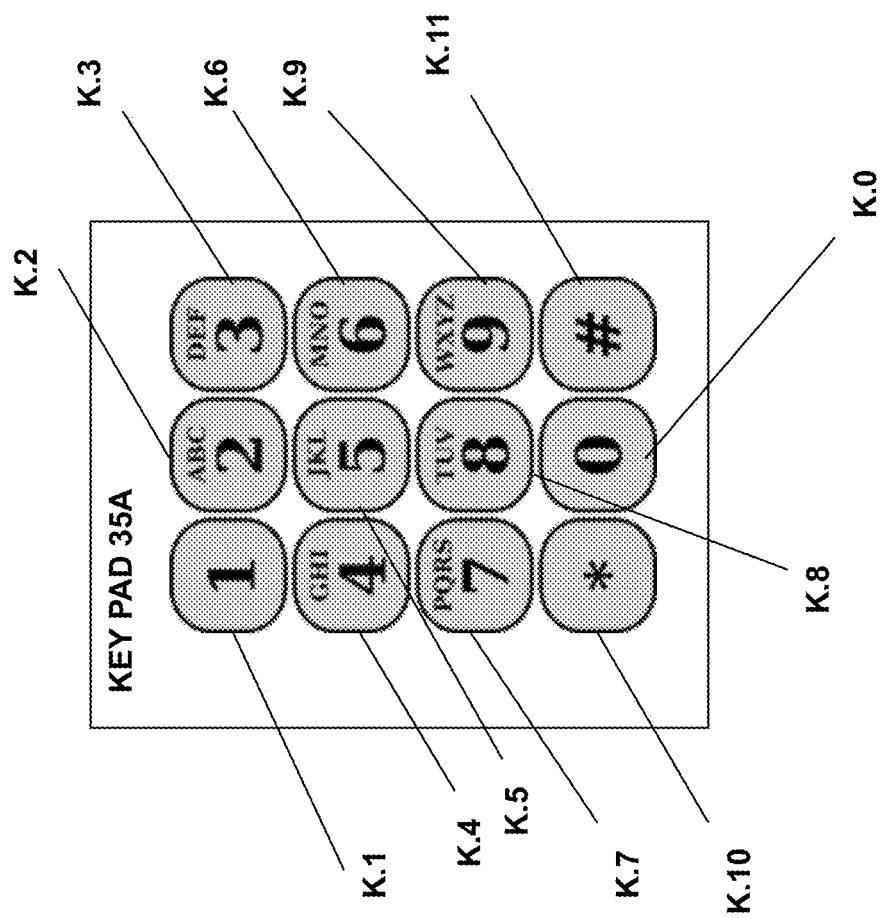
FIG. 12 is a schematic diagram of a telephone keypad of the input device of FIG. 2.
Figure 13:
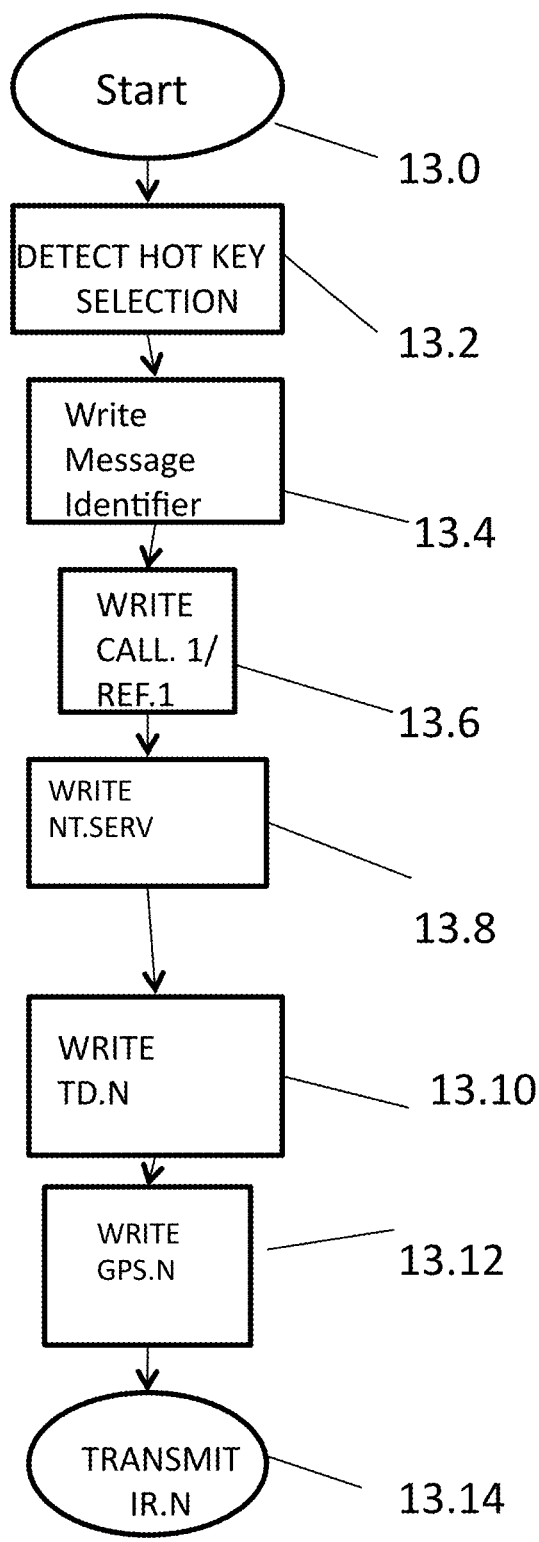
FIG. 13 is a flowchart of a process of the first device of FIGS. 1, 2 and 4 may generate a communications initiation request.

Referring now to FIG. 8 and FIG. 9, FIG. 8 is a flowchart of a software process executable by the server 12. In step 8.02 the server 12 receives a communications initiation request IR.N, as shown in FIGS. 12 and 13, from the first communications device 4 to request selection of, and enablement of communication with, another device, e.g., the second communications device 6.

Referring now to FIG. 9, the communications initiation request IR.N of step 8.02 may be initiated by the first party selecting an input device of the first communications device 6, for example wherein the first party depresses the pound sign K.11 of the digital telephone key pad 35A of the first communications device 4 for a length of time exceeding three seconds.

Referring now to FIG. 8, in step 8.04 of the process of FIG. 8 the server 12 receives a pattern fraction PF.1-PF.N transmitted from the FIFO 19 of the first communications device 4, from the first communications device 4 and stores a received pattern fraction PF.1-PF.N in the server's system memory 16. The server 12 determines in step 8.06 whether the pattern fraction PF.1-PF.N received in step 8.04 approximately or exactly matches a pattern fraction PF.1-PF.N received from another device, e.g. the second communications device 6. When the server 12 determines in step 8.06 that the pattern fraction PF.1-PF.N received in step 8.04 does not sufficiently match a pattern information PF.1-PF.N previously received from another device 4 or 6, the server 12 saves the last received pattern fraction PF.1-PF.N and proceeds from step 8.06 to step 8.08 and to determine whether the process of steps 8.02 through 8.06 shall be timed out. When the server 12 determines in step 8.08 that the process of steps 8.02 through 8.06 has timed out, the server 12 proceeds from step 8.08 to step 8.10, wherein the server deletes or archives the pattern fractions PF.1-PF.N received in one or more executions of step 8.04. The server 12 proceeds form step 8.10 to step 8.12 and to perform additional and/or computational processes.

When the server 12 determines in step 8.08 that the process of steps 8.02 through 8.06 has not timed out, the server 12 proceeds from step 8.08 and to again execute step 8.02 and to receive another pattern fraction PF.1-PF.N from the first communications device 4 in another execution of step 8.04.

It is understood that in alternate aspects of the method of the present invention the fulfillment of steps 8.02 and 8.04, and others processes of the method of FIG. 8, may be achieved by applying Internet connections under the TCP/IP protocols and/or by SMS techniques.

When the server 12 determines in step 8.06 that the pattern fraction(s) PF.1-PF.N received in one or more executions of step 8.04 from the first device 4 do sufficiently match an element of pattern information PF.1-PF.N previously received from another device, e.g., the second communications device 6, the server 12 proceeds from step 8.06 to step 8.13 and transmits match signals to the communications devices 4 and 6 from which the matching pattern fraction PF.1-PF.N and pattern information PF.1-PF.N have been received. The server 12 proceeds from step 8.12 to step 8.14 to (a.) set a confirmation time counter Tc equal to a zero value; and to (b.) generate a communication record R.N. The confirmation time counter Tc is incremented by clock pulses from a server real time clock 23B. The server 12 additionally populates the communication record R.N in step 8.14 with a record identifier R.ID, a first device address CALL.1, a second device address CALL.2, optionally with a first device reference REF.1 and optionally with a second device reference REF.2.

The first device address CALL.1 may be a database record reference number, a phone number, an email address, an Internet TCP/IP address, an Internet universal resource locator, and/or a communications network address that identifies messages as bound for the first communications device 4 as a message destination. The second device address CALL.2 may be a database record reference number, a phone number, an email address, an Internet TCP/IP address, an Internet universal resource locator, and/or a communications network address that identifies messages as bound for the second communications device 6 as a message destination. The first reference REF.1 may be an alphanumeric pattern that enables the first party to reference the communications record R.N formed and populated in step 8.14 and direct the network 2 or the server 12 to send, or enable sending, a first message to the second communications device 6, wherein the first message addressed to the second communications device 6 at the second device address CALL.2. It is understood that the first message sent from the first communications device 4 to the second communications device 6 may be a phone call initiation signal.

The second reference REF.2 is an alphanumeric pattern that enables the second party to reference the communications record R.N formed and populated in step 8.14 to direct the network 2 or the server 12 to send, or enable sending, an alternate message to the first communications device 4, wherein the alternate message shall be addressed to the first communications device 6 at the first device address CALL.1. It is understood that the alternate message sent from the first communications device 4 to the second communications device 6 may be a phone call initiation signal.

In step 8.16 the server 12 transmits a first invitation message to the first device 4 to accept a capability to communicate with the second device 6, and a second invitation message to the second device 6 to accept a capability to communicate with the first device 4.

Figure 19:
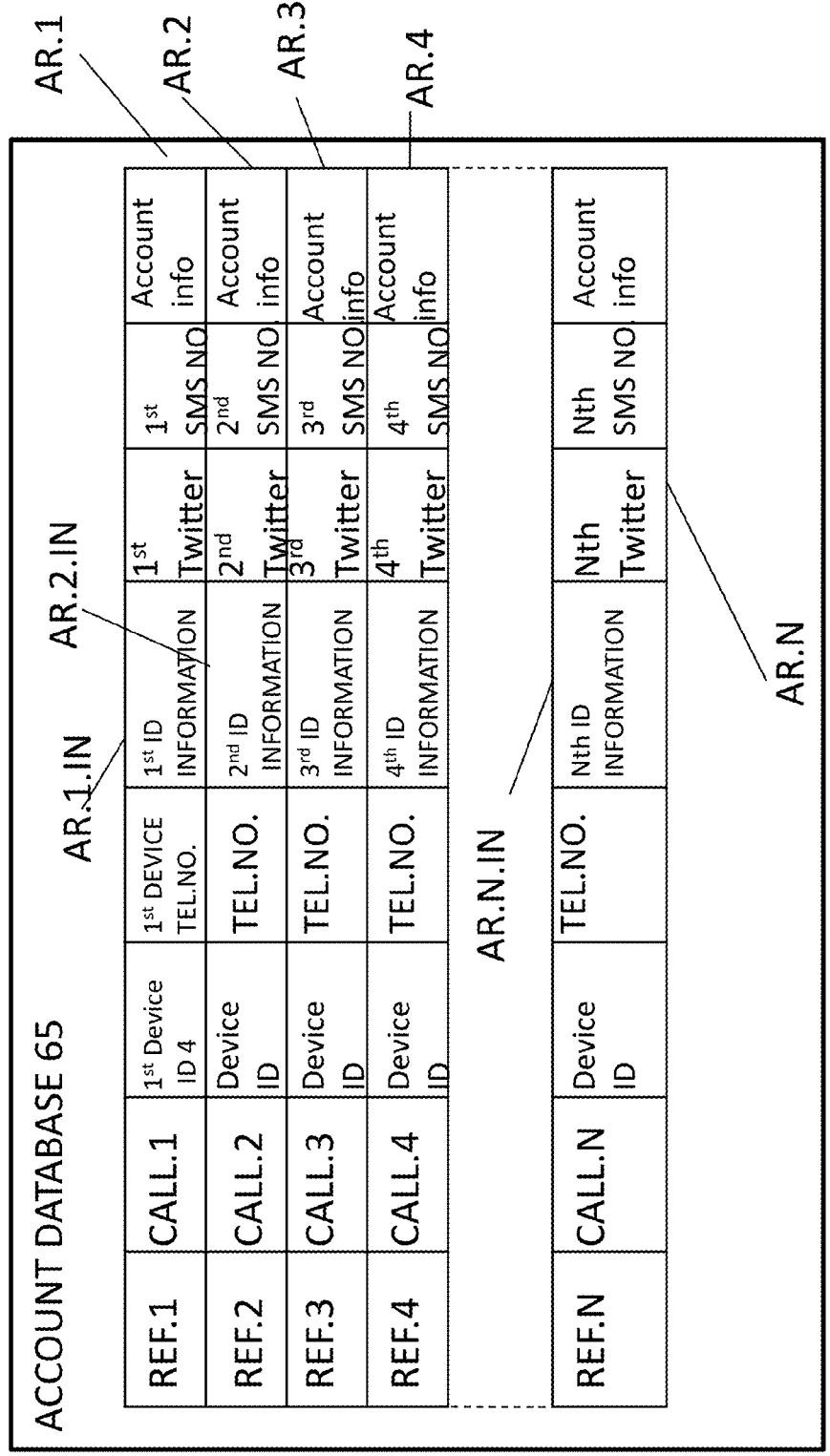
FIG. 19 is a schematic illustration of the account database of FIG. 4.

Referring now to FIG. 8 and FIG. 19, in step 8.16 of the process of FIG. 8, the server 12 further optionally (a.) references the first device address CALL.1 within the server data base 70 and extracts a first identity information AR.1.IN from a first device account record AR.0; (b.) references the second device address CALL.2 within the server data base 70 and extracts a second identity information AR.2.IN from a second device account record AR.2; (c.) transmits the first identity information AR.1.IN to the second communications device 6; and/or (d.) transmits the second identity information AR.2.IN to the first device 4.

Each identity information AR.1.IN-AR.N.IN may describe some permanent or temporary quality, datum, or descriptor associated with an identified user or account holder of an associated device 4 or 6, and may be provided to another communications device 4 or 6 or party to enable a receiving party to determine whether or not to accept a request to enable the party associated with the received identity information to communicate with the receiving party in accordance with the method of the present invention. In other words, as transmitted in step 8.16 the first party may receive the second identity information AR.2.IN associated with the second party, and the first party may then consider the received second identity information AR.2.IN to determine whether or not to transmit a confirmation signal sought by the server 12 in steps 8.20 and step 8.22.

In one example, offered as explanatory only and not including any limitation of either the method of the present invention or the scope of the invention as claimed, a first identity information AR.1.IN might indicate that first party is the owner of the first communication device 4 and further disclose to the receiving party that the first party is a heterosexual male, is under thirty years of age, is a moderate consumer of alcoholic beverages, has blonde hair, resides in Chicago and is currently visiting New York City. This first identity information AR.1.IN may be useful to the second party to determine (a.) whether the second party has previously seen the first party; and (b.) whether the second party might desire to have the capability of requesting a communications session with the first party. In another example of the nature and utility of the identity information, again offered as explanatory only and not including any limitation of either the method of the present invention or the scope of the invention as claimed, the second identity information AR.2.IN might indicate that second party is the owner of the second communication device 6, and further disclose to the receiving party that the second party is female, under thirty years of age, does not smoke tobacco, and typically wears eyeglasses. This second identity information AR.2.IN may be useful to the second party to determine (a.) whether the first party has previously seen the second party; and (b.) whether the first party might desire to have the capability of requesting a communications session with the second party.

In optional step 8.16 the server 12 may (a.) locate the first identity information AR.1.IN within the server database 70 by referencing the first device address CALL.1 and/or the first reference REF.1; (b.) transmit the first identity information AR.1.IN to the second communications device 6; (c.) locate the second identity information AR.2.IN within the server database 70 by referencing the second device address CALL.2 and/or the second reference REF.2; and/or (d.) transmit the second identity information AR.2.IN to the first communications device 4 via the network 2.

The server 12 proceeds from step 8.14 to step 8.18 and determines whether the confirmation time value Tc has increased beyond a predetermined value of a confirmation time limit T2. T2 is preferably less than 1 day and is more preferably less than 1 hour. When the server 12 determines in step 8.18 that the confirmation time value Tc has not increased beyond T2 the value of the confirmation time limit T2, the server 12 proceeds from step 8.16 to step 8.20. In steps 8.20 and 8.22 the server 12 determines whether both the first device 4 and the second device 6 have issued a confirmation signal within the value of the confirmation time limit T2, wherein the receipt of a confirmation message signifies that the party operating the communications device 4 or 6 transmitting the confirmation signal desires to create a capability of requesting to communicate with the other communications device 4 or 6.

When the server 12 determines in steps 8.20 and 8.22 that each the first device 4 and the second device 6 has issued a confirmation signal, the server proceeds to step 8.24 and to send reference data R.ID, REF.N, and/or CALL.N to each communications device 4 & 6.

It is understood that the record identifier R.ID, the first reference REF.1 and the second reference REF.2 enable a party to reference a communications record R.N comprising these references REF.1 & REF.2 and identifier R.ID, but that knowledge of a device address CALL.1 or CALL.2 enable a party to directly request a communications session with a device 4 or 6 associated with the device address CALL.1 or CALL.2. It is understood that transmitting one or more device addresses CALL.1 or CALL.2 is an optional or alternative aspect of step 8.24.

The server 12 proceeds from step 8.24 to step 8.26 and to perform additional and/or computational processes.

When the server 12 determines in steps 8.18 that the server 12 had not received confirmation signals from both the first device 4 and the second device 6 within the confirmation time limit value T2 measured from the initialization of the confirmation time counter Tc of most recent execution of step 8.14, the server 12 proceeds from step 8.18 to step 8.28 and to (a.) reinitialize the confirmation time counter Tc; and (b.) to erase the communications record R.N formed in step 8.14. The server 12 proceeds from step 8.28 to step 8.26 and to perform additional and/or computational processes.

The record identifier R.ID may be transmitted to the first communications device 4 and enables the first communications device 4 to send a request to initiate a communications session to the second communications device 6. The record identifier R.ID may additionally, alternatively or optionally be transmitted to the second communications device 6 and enables the second communications device 6 to send a request to initiate a communications session to the first communications device 4. The first party address data CALL.1 enables the server 12 to direct electronic messages to the first communications device 4 and to thereby initiate and maintain a communications session between the first communications device 4 and the second communications device 6. The second party address data CALL.2 enables the server 12 to direct electronic messages to the second communications device 6 and to thereby initiate and maintain a communications session between the first communications device 4 and the second communications device 6. As mentioned above, the first party address data CALL.1 and the second party address data CALL.2 may each be or comprise a database record reference number, a telephone number, an email address, a universal resource locator of the Internet, a network address of a computer network, and/or a website address.

Figure 15:
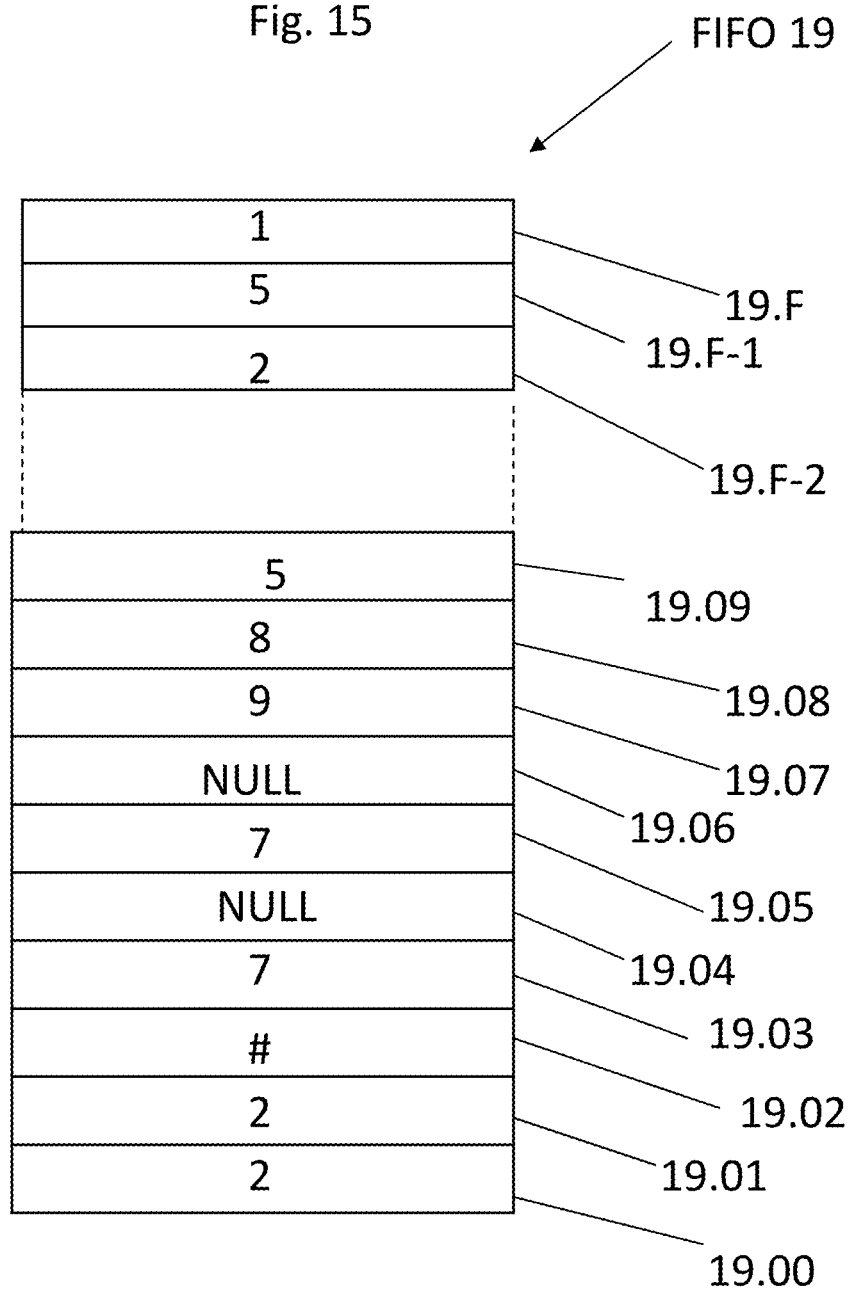
FIG. 15 is an illustration of the first-in first-out register of FIG. 2.
Figure 16:
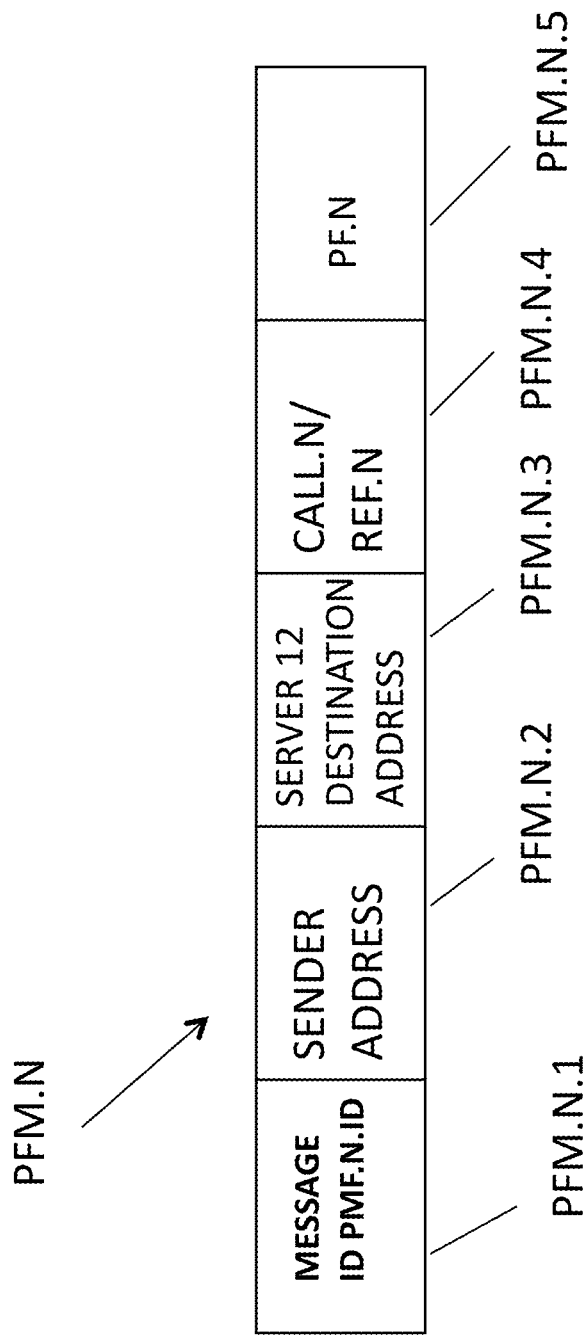
FIG. 16 is an illustration of the format and contents of a pattern fragment message.

Referring now to FIG. 9, FIG. 9 is a flowchart of a software process executable by the first communications device 4. In step 9.02 a series of user selections of the input device 42 are recorded in the FIFO 19 to form a pattern fraction PF.N. Referring now to FIGS. 9, 13, and 15 one exemplary aspect of the method of the present invention, the first communications device 4 may be a cellular telephone and the input device may be a touch or heat sensitive telephone keypad 35A, as included in an iPhone™ cellular telephone 4, wherein the FIFO 19 records the selections by the user of keys K.1-K.11 of the telephone keypad 35A in an order as selected by the first party. Referring now to FIG. 16, when the FIFO 19 contains a full pattern fraction PF.N, e.g. of a preset quantity of F entries of the FIFO 19, the pattern fraction PFM.N as stored in the FIFO 19 is transmitted to the server 12 in step 9.04 within a pattern message.

The first communications device 4 determines in step 9.06 whether the first communications device 4 has received a match signal indicating that the server 12 has found a match between at least one pattern fraction PF.1-PF.N sent transmitted by the first communications device 4 and a pattern information PF.1-PF.N provided by another source, e.g., the second communications device 6, the system 13, the sensory module 14, and/or the pattern generator 82. When the first communications device 4 determines in step 9.06 to not have received a pattern match signal, the first device proceeds from step 9.06 to step 9.08 and to determine whether the first communications device 4 shall cease recording pattern fractions. When the first device 4 determines in step 9.08 to cease recording pattern fractions, the first device 6 proceeds to step 9.10 and to perform alternate or additional computational functions.

When the first communications device 4 determines in step 9.06 to have received a match signal, the first device 6 receives in step 9.12 a communication invitation from the server 6, optionally containing the identity information AR.2.IN associated with the device 6, generator 82 or system 13 or 14 that provided the pattern information PF.1-PF.N to the server 12. In step 9.14 the first device 6 rings and/or vibrates, and optionally displays the identity information received in step 9.12. In step 9.16 the first device 4 determines whether user has indicated an acceptance of the communication invitation of step 9.12.

When the first device 4 determines in step 9.16 that user has not indicated an acceptance of the communication invitation of step 9.12, the first device 4 proceeds to step 9.18 and ceases ring, vibrating and/or displaying the second identity information AR.2.IN and then proceeds on to step 9.08. Alternatively, when the first device 4 determines in step 9.16 that user has indicated an acceptance of the communication invitation of step 9.12, the first device 4 proceeds to step 9.20 and ceases ring, vibrating and/or displaying the second identity information AR.2.IN and then proceeds on to step 9.22 and transmits a confirm signal to the server 12. The first device 4 then receives a record identifier R.ID, a first reference REF.1 and/or a second device address CALL.2 in step 9.24. The information received by the first device 4 in step 9.24 enables the user of the first device 4, in coordination with the server 12, to thereafter send a communications request to the second device 6.

The first device 6 proceeds from step 9.24 to step 9.10 and to perform alternate or additional computational functions.

Figure 10:
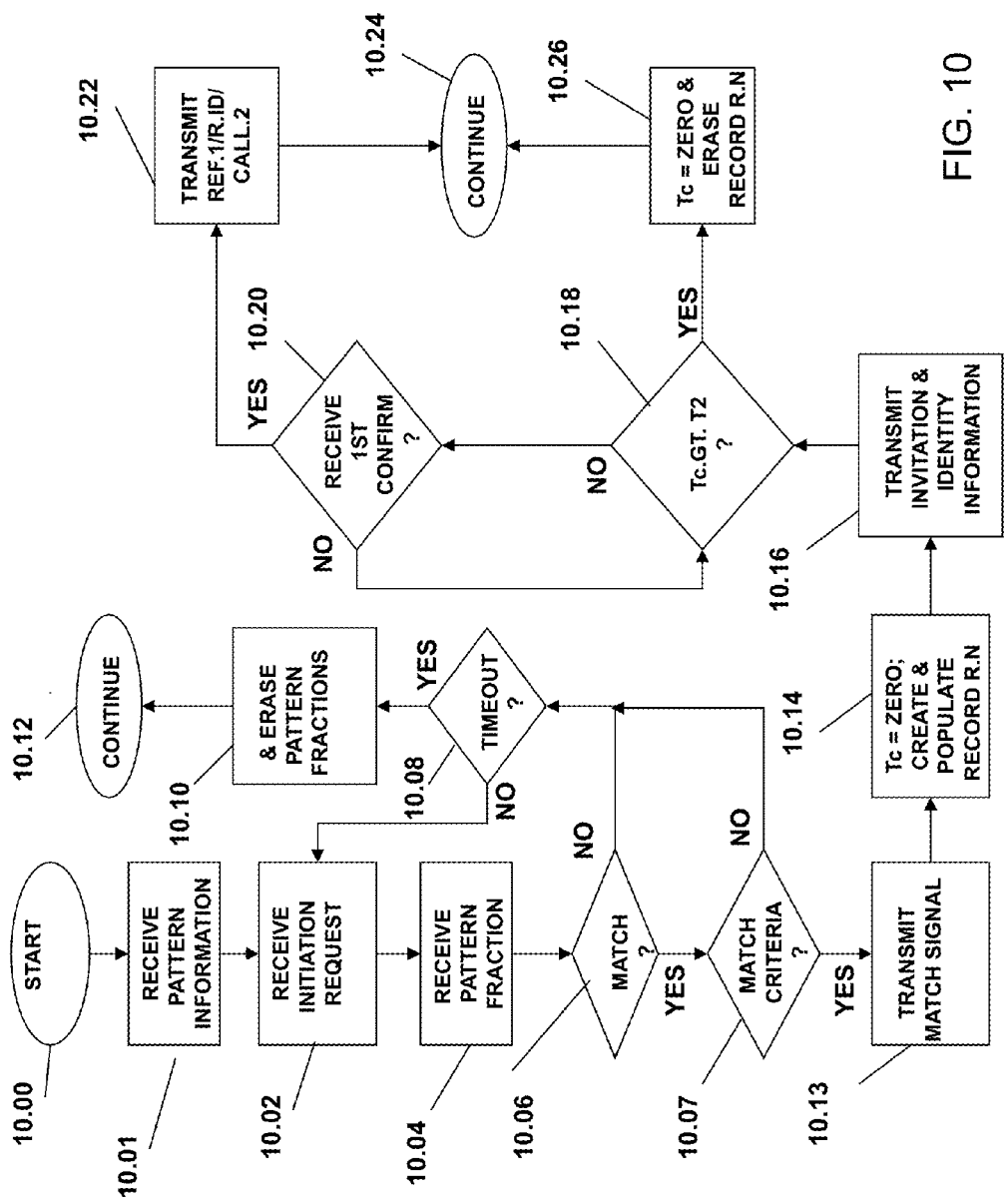
FIG. 10 is a flowchart of a process of the server of FIGS. 1, 3 and 5, wherein only the confirmation of a user of the first device of FIGS. 1, 2 and 4 is required to form a communications record.

Referring now generally to the Figures and particularly to FIG. 10, FIG. 10 is a flowchart of a process of the server 12 wherein only the confirmation of a user of the first device 4 is required to form a communications record REC.N. In step 10.01 the server 12 generates a pattern information PF.1-PF.N, and/or receives a pattern information PF.1-PF.N from the second device 6, the alternate system 5, the automated system 13, the sensory module 14, and/or the network 2. For purposes of clarity, the pattern information PF.1-PF.N will be referred to as being received from the second communications device 6 in the discussion of FIG. 10 below, whereas the method of the present invention teaches that the pattern information PF.1-PF.N may be generated or sourced from the pattern generator 49, the alternate system 5, the automated system 13, the sensory module 14, and/or the network 2.

In step 10.02 the server 12 receives a communications initiation request IR.N, as shown in FIGS. 12 and 13, from the first communications device 4 to request selection of, and enablement of communication with the second communications device 6. The server 12 in step 10.02 thereupon sets a pattern receipt time counter Tp equal to a zero value. The pattern receipt time counter Tp is incremented by clock pulses from the server real time clock 23B.

The request received from the first communications device 6 in step 10.02 includes a first device address CALL.1 that may be used by the server 12 to reference information associated with the first communications device 6 as stored within the server DBMS 54, the account database 65, the network 2, and/or accessible to the network 2

In step 10.04 the server 12 receives a pattern fraction PF.1-PF.N from the first communications device 4 and stores the received pattern fraction PF.1-PF.N in the server's system memory 16. The server 12 applies the pattern matching logic 49 in step 10.06 and determines whether the pattern fraction PF.1-PF.N received in step 10.04 approximately or exactly matches a pattern information PF.1-PF.N previously received the second communications device 6. When the server 12 determines in step 10.06 that the pattern fraction PF.1-PF.N received in step 10.04 does not sufficiently match a pattern information PF.1-PF.N previously received from another device 4 or 6, the server 12 saves the last received pattern fraction PF.1-PF.N and proceeds from step 10.06 to step 10.08 and to determine whether the process of steps 10.02 through 10.06 has timed out. When the server 12 determines in step 10.08 that the process of steps 10.02 through 10.06 has timed out, the server 12 proceeds from step 10.08 to step 10.10, wherein the server deletes or archives the pattern fractions PF.1-PF.N received in one or more executions of step 10.04. The server 12 proceeds form step 10.10 to step 10.12 and to perform additional and/or computational processes.

When the server 12 determines in step 10.08 that the process of steps 10.02 through 10.06 has not timed out, the server 12 proceeds from step 10.08 and to again execute step 10.02 and to receive another pattern fraction PF.1-PF.N from the first communications device 4 in another execution of step 10.04.

When the server 12 determines in step 10.06 that the pattern fraction(s) PF.1-PF.N received in one or more executions of step 10.04 from the first device 4 do sufficiently match an element of pattern information PF.1-PF.N previously received from another device, e.g., the second communications device 6, the server 12 proceeds from step 10.06 to step 10.06 to determine whether information accessible to the server 12 by reference to the first device address CALL.1 indicates that the request of step 10.02 received from the first communications device 4 matches a criteria. For example, the server 12 may require that the first device address CALL.1 be associated with a criteria that a person owning the first communications device 4 must be registered as a student at a specific University. Alternatively or additionally the server 12 may require that the first device address CALL.1 be associated with a criteria that a person owning the first communications device 4 must reside within a certain geographic area.

When the server determines in step 10.07 that the first device address CALL.1 does not match the criteria, the server 12 proceeds from step 10.07 to step 10.08.

When the server determines in step 10.07 that the first device address CALL.1 does match the criteria, the server 12 proceeds from step 10.07 to step 10.13, wherein the sever 12 transmits a match signal to the first communications device 4. The server 12 proceeds from step 10.13 to step 10.14 to (a.) set the confirmation time counter Tc equal to a zero value; and to (b.) generate a communication record R.N. The confirmation time counter Tc is incremented by clock pulses from the server real time clock 23B. The server 12 additionally populates the communication record R.N in step 10.14 with a record identifier R.ID, a first device address CALL.1, a second device address CALL.2, optionally with a first device reference REF.1 and optionally with a second device reference REF.2.

In step 10.16 the server 12 transmits a first invitation message to the first device 4 to accept a capability to communicate with the second device 6. In step 10.16 the server 12 further optionally (a.) references the second device address CALL.2 within the server data base 70 and extracts the second identity information AR.2.IN from the second device account record AR.2; and (c.) transmits the second identity information AR.2.N to the first device 4.

The server 12 proceeds from step 10.16 to step 10.18 and determines whether the confirmation time value Tc has increased beyond a predetermined value of a confirmation time limit T2. T2 is preferably less than 1 day and is more preferably less than 1 hour. When the server 12 determines in step 10.18 that the confirmation time value Tc has not increased beyond T2 the value of the confirmation time limit T2, the server 12 proceeds from step 10.16 to step 10.20. In step 10.20 the server 12 determines whether the first communications device 4 has issued a confirmation signal within the value of the confirmation time limit T2, wherein the receipt of a confirmation message signifies that the party operating the communications device 4 or 6 transmitting the confirmation signal desires to create a capability of requesting to communicate with the other communications device 4 or 6.

When the server 12 determines in steps 10.20 that the server 12 has received a confirmation signal from the first device 4, the server proceeds to step 10.24 and to send reference data R.ID, REF.N, and/or CALL.N to the first communications device 4 and the second communications device 6.

The server 12 proceeds from step 10.22 to step 10.24 and to perform additional and/or computational processes.

When the server 12 determines in steps 10.18 that the server 12 had not received confirmation signals from first communications device 4 within the confirmation time limit value T2 measured from the initialization of the confirmation time counter Tc of most recent execution of step 10.14, the server 12 proceeds from step 10.18 to step 10.26 and to (a.) reinitialize the confirmation time counter Tc; and (b.) to erase the communications record R.N formed in step 10.14. The server 12 proceeds from step 10.26 to step 10.24 and to perform additional and/or computational processes.

Figure 11:
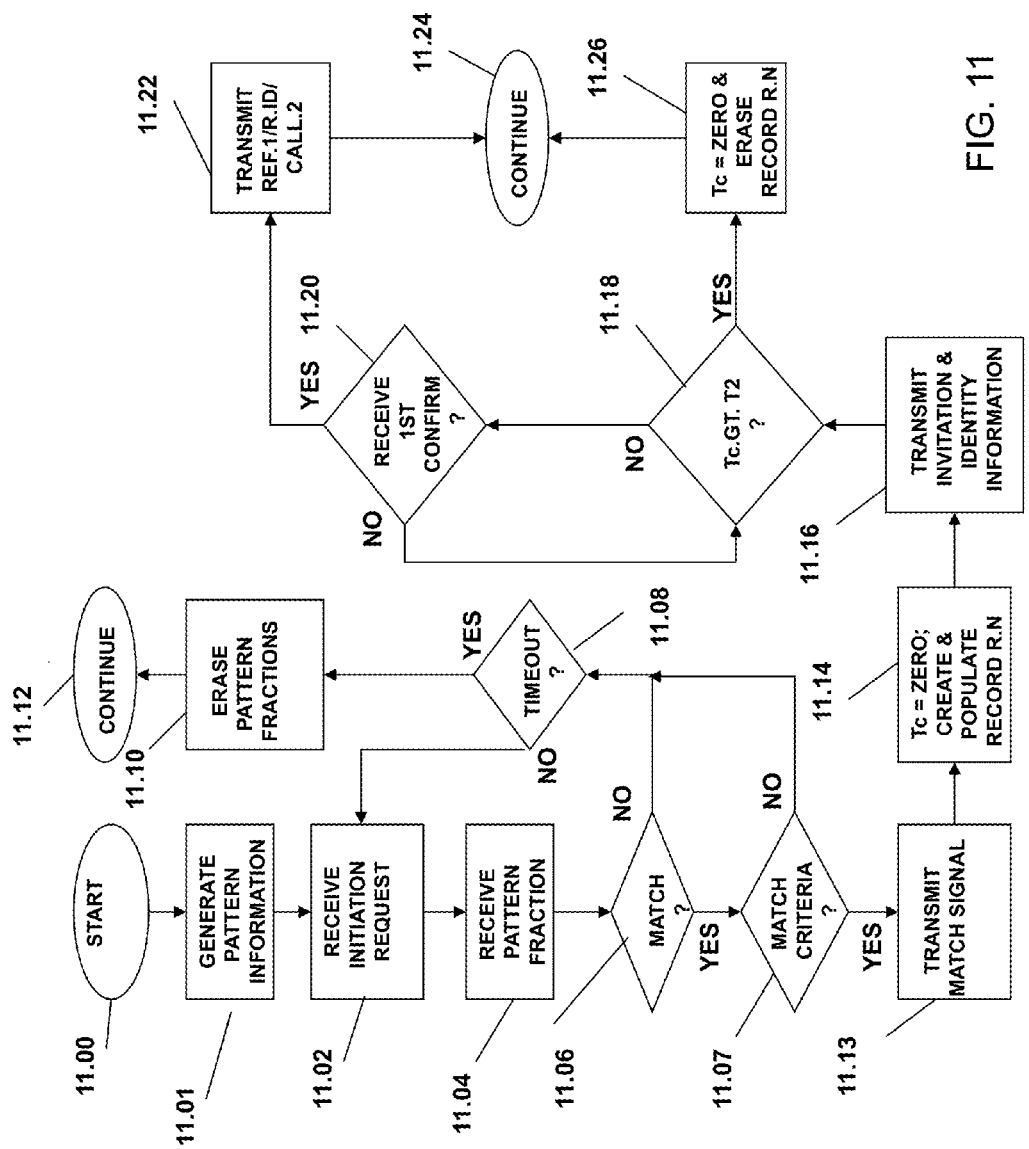
FIG. 11 is a flowchart of a process of the server of FIGS. 1, 3 and 5, wherein only the confirmation of a user of the first device of FIGS. 1, 2 and 4 is required to form a communications record.

Referring now generally to the Figures and particularly to FIG. 11, FIG. 11 is a flowchart of a process of the server 12 wherein only the confirmation of a user of the first device 4 is required to form a communications record REC.N. In step 11.01 the server 12 generates or receives a pattern information PF.1-PF.N. from the second device 6, the alternate system 5, the telecom server 9, the automated system 13, the sensory module 14, and/or the network 2. For purposes of clarity, the pattern information PF.1-PF.N will be referred to as being generated by the pattern generator 82 of the server 12 in the discussion of FIG. 11 below, whereas the method of the present invention teaches that the pattern information PF.1-PF.N may be generated or sourced from the pattern generator 49, the alternate system 5, the automated system 13, the sensory module 14, and/or the network 2.

In step 11.02 the server 12 receives a communications initiation request IR.N, as shown in FIGS. 12 and 13, from device 4 to request selection of, and enablement of communication with the automated system 13. The server 12 in step 11.02 thereupon sets a pattern receipt time counter Tp equal to a zero value. The pattern receipt time counter Tp is incremented by clock pulses from the server real time clock 23B.

The communications initiation request IR.N received from the first communications device 6 in step 11.02 includes a first device address CALL.1 that may be used by the server 12 to reference information associated with the first communications device 6 as stored within the server DBMS 54, the account database 65, the network 2, and/or accessible to the network 2

In step 11.04 the server 12 receives a pattern fraction PF.1-PF.N from the first communications device 4 and stores the received pattern fraction PF.1-PF.N in the server's system memory 16. The pattern fraction PF.1-PF.N may have been generated by the user of the first device 4 by selecting keys K.0-K.11 in an attempt by the first user to follow a timing of a pattern of sensory stimuli generated by the sensory module 14, the alternate system 5, and/or the automated system 13.

The server 12 applies the pattern matching logic 49 in step 11.06 and determines whether the pattern fraction PF.1-PF.N received in step 11.04 approximately or exactly matches a pattern information PF.1-PF.N previously received the second communications device 6. When the server 12 determines in step 11.06 that the pattern fraction PF.1-PF.N received in step 11.04 does not sufficiently match a pattern information PF.1-PF.N previously received from another device 4 or 6, the server 12 saves the last received pattern fraction PF.1-PF.N and proceeds from step 11.06 to step 11.08 and to determine that the process of steps 11.02 through 11.07 has timed out. When the server 12 determines in step 11.08 that the that the process of steps 11.02 through 11.07 has timed out, the server 12 proceeds from step 11.08 to step 11.10, wherein the server deletes or archives the pattern fractions PF.1-PF.N received in one or more executions of step 11.04. The server 12 proceeds form step 11.10 to step 11.12 and to perform additional and/or computational processes.

When the server 12 determines in step 11.08 that that the process of steps 11.02 through 11.07 has not timed out, the server 12 proceeds from step 11.08 and to again execute step 11.02 and to receive another pattern fraction PF.1-PF.N from the first communications device 4 in another execution of step 11.04.

When the server 12 determines in step 11.06 that the pattern fraction(s) PF.1-PF.N received in one or more executions of step 11.04 from the first device 4 do sufficiently match an element of pattern information PF.1-PF.N previously received from another device, e.g., the second communications device 6, the server 12 proceeds from step 11.06 to step 11.07 to determine whether information accessible to the server 12 indicates that a system criteria are satisfied. For example, the server 12 may limit a number of device 4 & 6 that may form a communications record with references CALL.3 or REF.3 to the alternate system 5 or the automated system 13.

When the server determines in step 11.07 that the system criteria are not satisfied, the server 12 proceeds from step 11.07 to step 11.08.

When the server determines in step 11.07 that the system criteria, are satisfied the server 12 proceeds from step 11.07 to step 11.13, wherein the sever 12 transmits a match signal to the first communications device 4. The server 12 proceeds from step 11.13 to step 11.14 to (a.) set the confirmation time counter Tc equal to a zero value; and to (b.) generate a communication record R.N. The confirmation time counter Tc is incremented by clock pulses from the server real time clock 23B. The server 12 additionally populates the communication record R.N in step 10.14 with a record identifier R.ID, a first device address CALL.1, an alternate address CALL.N, optionally with a first device reference REF.1 and optionally with an alternate reference REF.N. The alternate address CALL.N or alternate reference REF.N may be associated with a person, a corporation, a device 6, or a computational system 5, 12, and/or 13.

In step 11.16 the server 12 transmits a first invitation message to the first device 4 to accept a capability to communicate with the system referencable by the alternate address CALL.N and/or alternate reference REF.N. In step 11.16 the server 12 further optionally (a.) references the alternate address CALL.N within the server database 70 and extracts an alternate information AR.N.IN from an alternate account record AR.N and (c.) transmits the alternate identity information AR.N.IN to the first device 4.

The server 12 proceeds from step 11.16 to step 11.18 and determines whether the confirmation time value Tc has increased beyond a predetermined value of a confirmation time limit T2. T2 is preferably less than 1 day and is more preferably less than 1 hour. When the server 12 determines in step 11.18 that the confirmation time value Tc has not increased beyond T2 the value of the confirmation time limit T2, the server 12 proceeds from step 11.18 to step 11.20. In step 11.20 the server 12 determines whether both the first device 4 has issued a confirmation signal within the value of the confirmation time limit T2, wherein the receipt of a confirmation message signifies that the party operating the first communications device 4 transmitting the confirmation signal desires to create a capability of requesting to communicate with the other device 6 or system 5, 12 and/or 13.

When the server 12 determines in steps 11.20 that the server 12 has received a confirmation signal from the first device 4, the server 12 proceeds to step 11.24 and to send reference data R.ID, REF.N, and/or CALL.N to the first communications device 4.

The server 12 proceeds from step 11.22 to step 11.24 and to perform additional and/or computational processes.

When the server 12 determines in steps 11.18 that the server 12 had not received confirmation signals from first communications device 4 within the confirmation time limit value T2 measured from the initialization of the confirmation time counter Tc of most recent execution of step 11.14, the server 12 proceeds from step 11.18 to step 11.26 and to (a.) reinitialize the confirmation time counter Tc; and (b.) to erase the communications record R.N formed in step 11.14. The server 12 proceeds from step 11.26 to step 11.24 and to perform additional and/or computational processes.

Referring now to FIG. 12, the digital telephone input device key pad 35A includes twelve keys K.1-K.11, which may be used by the first user to direct the first device 4 to initiate, generate and transmit messages and request communications sessions. The selection of one or more keys K.0-K.11 may indicate a selection of a hot key as described in process step 13.02 of the process of FIG. 13, whereby the first party directs the first device 4 to format, populate and transmit a message communications initiation request IR.N to the server 12. The message communications initiation request IR.N when received by the server 12 requests the server to accept pattern fragments PF.1-PF.N for comparisons with one or more pattern informations PI.1-PI.N.

The key pad 35A may be touch sensitive, wherein human finger tip pressure is sufficient to cause the key pad 35A to determine that a key K.0-K.11 has been selected. Alternatively or additionally, key pad 35A may be touch sensitive, wherein heat generated from a human finger touching a key K.0-K.11 is sufficient to cause the key pad 35A to determine that a key K.0-K.11 has been selected.

Figure 14:
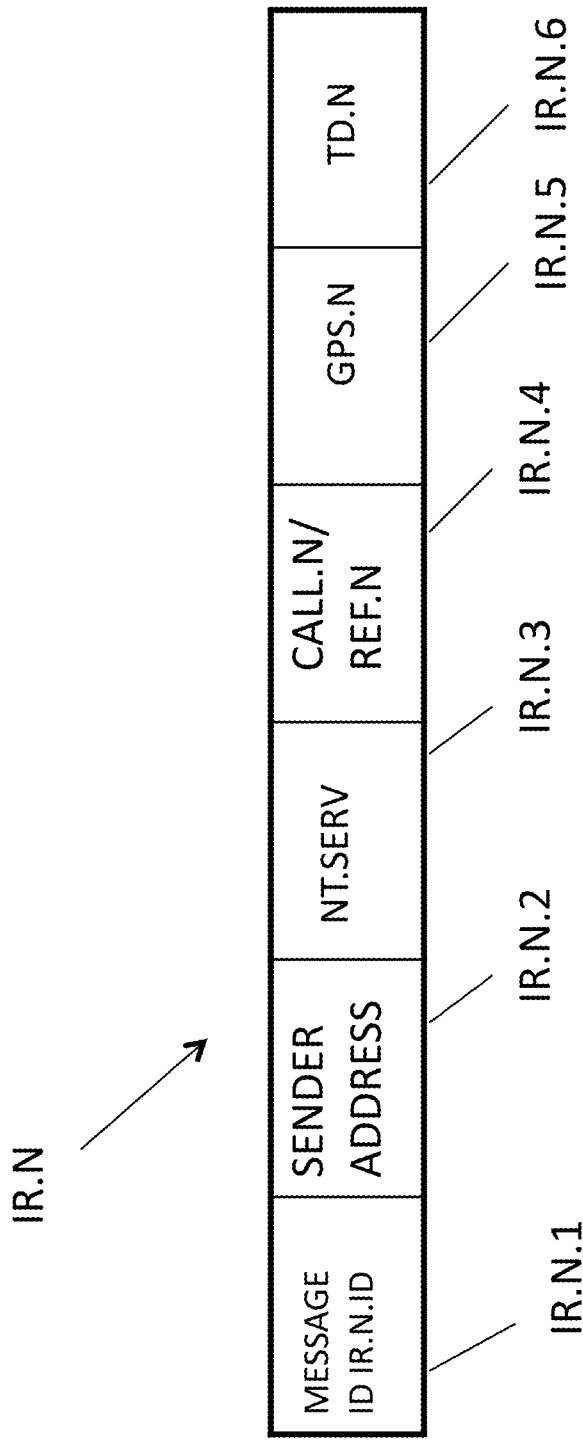
FIG. 14 is an illustration of the format and contents of the communications initiation request of FIG. 13.

Referring now generally to the Figures and FIG. 13 and FIG. 14, FIG. 13 is a flowchart of a process of the first device 4 may generate a communications initiation request IR.N. It is understood that the second communications device 6 may be similarly configured to execute the process of FIG. 13.

In step 13.02 the first device 4 detects a selection of a predesignated hot key K.0-K.11 of the keypad 35A whereupon the CPU 15 of the first device 4, in accordance with the system software 26, generates a communications request IR.N in steps 13.02-13.12 and transmits the generated communications initiation request IR.N to the server 12. The first device 4 generates a message identifier for the instant communications initiation request IR.N in step 13.4, and in step 13.6 the first device 4 writes the first device address CALL.1 and/or the first reference REF.1 into the communications initiation request IR.N. The first device 4 additionally writes a server network address NT.SERV into the communications initiation request IR.N in step 13.10. The first device further generates a time date data TD.N indicating the time of generation of the communications initiation request IR.N in optional step 13.10, and further enters a location reading GPS.N of the first device 4 in step 13.12. The first device 4 then transmits the communications initiation request IR.N via the network 2 to and addressed to the server 12 in step 13.14.

It is understood that the server 12 may optionally associate a geographic location or area with an information request message IR.N on the basis of previous activity of, or interaction with the first device 4 and the server 12 or the network 2. This geographic association optionally applicable by the server 12 and/or the optional device location reading GPS.N may be applied by the server 12 in a determination a likelihood that the first party or the second party may be desiring to establish an electronic communications session with the other party, the alternate system 5, the telecom server 9, the server 12, and/or the automated system 13.

Referring now generally to the Figures and particularly to FIG. 13 and FIG. 14, FIG. 14 is an illustration of the format and contents of the communications initiation request IR.N as generated by the first device 14 in accordance with the process of FIG. 13. A first initiation data field IR.N.1 includes an identifier IR.N.ID of the comprising communications initiation request IR.N. A second initiation data field IR.N.2 includes a network address of the device 4 or 6 or system 9, 12 or 13 generating the communications initiation request IR.N. A third initiation data field IR.N.3 includes a network address NT.SERV of the server 12. A fourth initiation data field IR.N.4 includes the first device address CALL.1 and/or the first reference REF.1 associated with the first device 4 within the account data base 65. An optional fifth initiation data field IR.N.5 includes a location data GPS.N that may be generated by the GPS location circuit 33 of the first device 6. An optional sixth initiation data field IR.N.6 includes the time date data TD.N generated by the client real time clock 23A of the first device 4.

Referring now generally to the Figures and particularly to FIGS. 2 and 15, FIG. 15 is an illustration of the FIFO 19 as storing a pattern fraction PF.2. Each cell 19.00-19.F of the FIFO 19 stores a single input number or character as received from the key pad 35A. The CPU 15 of the first device 4 references the client real time clock 23A to enable a sequence of equal duration timed input windows Tw.0-Tw.F, wherein each cell stores a number, a hash sign or an asterisk as selected by the first party. The timed input windows Tw.0-Tw.F are sequential and a full series of F windows of a timed input window Tw.0-Tw.F are required to fully load the FIFO 19. For example, when the total number of cells F is equal to 64, and the duration of each timed input window Tw.0-Tw.F is 0.25 seconds, the full sequence of the 64 cells 19.00-19.F of the FIFO 19 will be loaded in 16 seconds. The FIFO 19 is fully loaded before being read into a pattern fragment message PFM.N and sent to the server 12 as presented in steps 9.02 and 9.04 of FIG. 9.

When no selection of a key K.0-K.11 is detected by the first device 4 in a given input window Tw.0-Tw.N, a null value N is recorded in the relevant cell 19.00-19.F as represented in cell 19.04 and 19.06. It is understood that the hash value in the cell 19.02 is an erroneous value and would typically be a result of a selection error by the first user.

Referring now generally to the Figures and particularly to FIG. 16, FIG. 16 is an illustration of the format and contents of a pattern fragment message PFM.N as generated and transmitted by the first device 4, the second device 6, and/or a system 5, 9, or 13 of the network 2. A pattern fragment message identifier PFM.N.ID is stored in a first pattern fragment message data field PFM.N.1. A network address of the sender, e.g., the first device 4, the second device 6, and/or a system 5, 9, or 13, of the comprising pattern fragment message PFM.N is stored in a second pattern fragment message data field PFM.N.2. A third pattern fragment message data field PFM.N.3 includes a network address NT.SERV of the server 12. A fourth pattern fragment message data field PMF.N.4 includes the device address CALL.N and/or the reference REF.N associated with the sender, e.g., the first device 4, the second device 6, and/or a system 5, 9, or 13, of the comprising pattern fragment message PFM.N within the account data base 65. A fifth pattern fragment message payload data field PMF.N.5 includes a pattern fragment PF.N as read from the FIFO 19.

Figure 17:
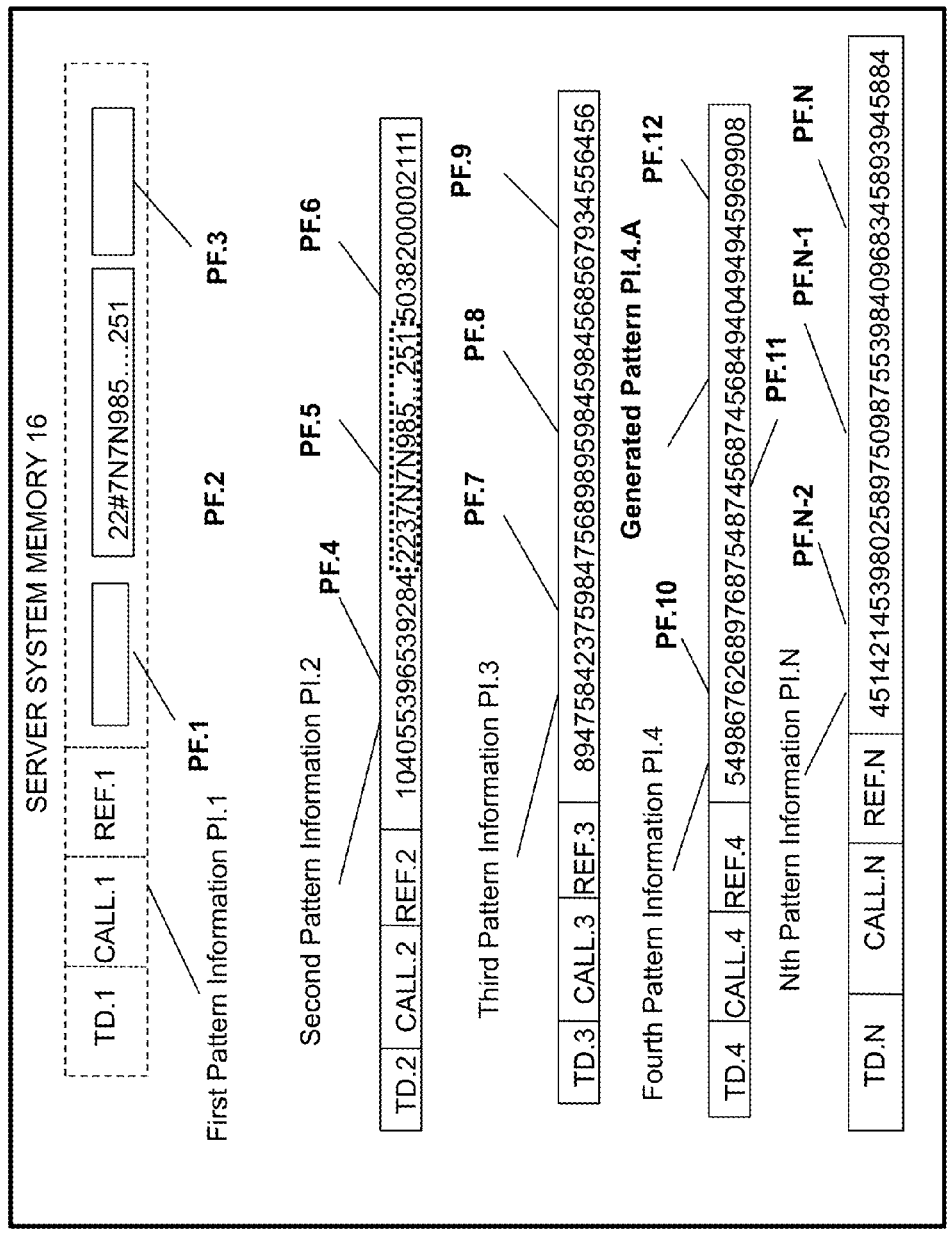
FIG. 17 is an illustration of pattern information as stored with the server system memory of FIG. 3.

Referring now generally to the Figures and particularly to FIG. 17, FIG. 17 is an illustration of pattern informations PI.1-PI.N as stored with the server system memory 16. A pattern information P.1-P.N may be received by the server 12 via the network 2 and/or generated by the server's pattern generator 82. A first exemplary pattern information P.1 is comprised of pattern fractions PF.1-PF.3 received by the server 12 from the first device 4 via the network 2. The first pattern information PI.1 may optionally or additionally include the first device address CALL.1, the first reference REF.1, and/or a first information time date stamp PITD.1. The first information time date stamp PITD.1 indicates to the server 12 the timeliness of the contents of the first pattern information PI.1.

A second exemplary pattern information PI.2 is comprised of pattern fractions PF.4-PF.6 generated by the second device 6 and received by the server 12 via the network 2. The second pattern information PI.2 may optionally or additionally include the second device address CALL.2, the second reference REF.2, and/or a second information time date stamp PITD.2. The second information time date stamp PITD.2 indicates to the server 12 the timeliness of the contents of the second pattern information PI.2.

A third exemplary pattern information PI.3 is comprised of pattern fractions PF.7-PF.9 generated by the automated system 13 and received by the server 12 via the network 2. The third pattern information PI.3 may optionally or additionally include an automated device address CALL.3, a third reference REF.3, and/or a third information time date stamp PITD.3. The third information time date stamp PITD.3 indicates to the server 12 the timeliness of the contents of the third pattern information PI.3.

A fourth exemplary pattern information PI.4 is comprised of a generated pattern PI.4.A as generated by the pattern generator 82 of the server 12. The pattern generator 82 of the server is configured to generate an alternate pattern PI.4.A that is identical, or substantially identical, to the alternate pattern PI.4.B as generated by the pattern generator 82 of the alternate system 5, wherein the alternate pattern PI.4.B is provided by the alternate system 5 to the sensory module 14 for from which sensory module 14 derives and generates sensory stimuli that is observable or detectable by the first party, the second party, and/or additional parties. It is understood that the either or both of the pattern generators 82 of the server 12 and/or the alternate system 5 may (1.) receive from the network 2 and/or the computer-readable 30; (2.) store the generated pattern PI.4.A and/or the alternate pattern PI.4.B; and (3.) provide the generated pattern PI.4.A and/or the alternate pattern PI.4.B to the sensory module 14 of the alternate system 5 and/or the server system memory 16.

NTH exemplary pattern information PI.N is comprised of pattern fractions PF.N-1-PF.N generated by an element of the network 2.

The process of determining a match of steps 8.06, 10.06 and 11.06 to may be accomplished by comparing each pattern fragment PF.1-PF.3 received from the first device 6 to the each of the other pattern informations PI.2-PI.N stored within the server system memory 16. Each pattern fragment PF.1-PF.3 may be compared to determine if a sequential match of a certain minimum values of the pattern fragment PF.1-PF.3 match a sequence of the pattern data contents of one or more of the other pattern informations PI.2-PI.N stored within the server system memory 16. For example, the server 12 might require that that 63 of 64 sequential values be identical in a comparison of (1.) any pattern fragment PF.1-PF.3 received from the first device 6 with (2.) a sequence of pattern values of a pattern information PI.2-PI.N in order to find that a match exists as referred to in steps 8.06, 10.06 and 11.06. In this example a match tolerance value could be expressed as being equal to the fractional value of $^{63}/_{64}$.

Figure 18:
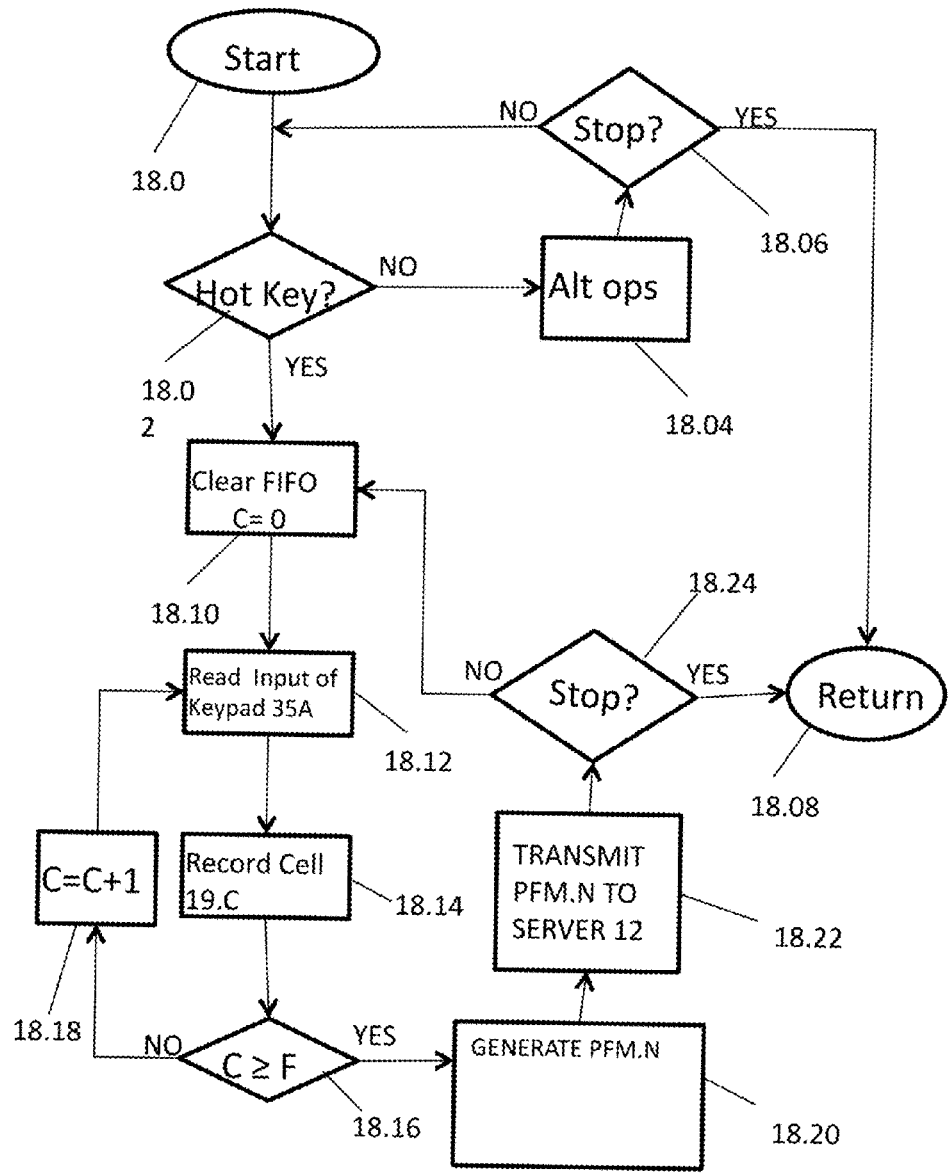
FIG. 18 is a flow chart of a process of the first device of FIGS. 1, 2 and 4 wherein a pattern fragment is generated and transmitted to the server of FIGS. 1, 3 and 5 as a pattern payload within a pattern fragment message of FIG. 16.

Referring now generally to the Figures and particularly to FIG. 18, FIG. 18 is a flow chart of a process of the first device 4 wherein a pattern fragment PF.N is generated and transmitted to the server 12 as a pattern payload PMF.N.5 within a pattern fragment message PFM.N. The first device 4 determines in step 18.02 whether the key pad 35A has sensed a selection of a hot key K.0-K.11 and thereby to direct the first device 4 to generate a pattern fraction PF.N. When the first device 4 determines in step 18.02 that the key pad 35A has not sensed a selection of a hot key K.0-K.11, the first device proceeds to step 18.04 and to perform alternate computational operations, and from step 18.04 to step 18.06 to determine whether to cease determinations of hot key selections. When the first device 4 determines in step 18.06 to cease the determination of hot key selections of step 18.02, the first device 4 proceeds on to step 18.08 and to proceed to perform additional computational operations. When the first device 4 determines in step 18.06 to continue the determination of hot key selections of step 18.02, the first device 4 proceeds to repeat step 18.02.

When the first device 4 determines in step 18.02 that the key pad 35A has sensed a selection of a hot key K.0-K.11, the first device proceeds to step 18.10 and to set a FIFO variable C to a zero value and optionally to clear the cells 19.00-19.F of values. In step 18.12 the first device 4 monitors the key pad 35A for an initial timing window Tw.0 and records a last sensed selection of any key K.0-K.11 within the initial timing window Tw.0 in a cell 19.C. The first device 4 loads up the FIFO 19 in the loop of steps 18.10 through 18.18 until all of the FIFO cells 19.0-19.F are sequentially loaded in the sequence of timing windows Tw.0 through Tw.F. A null value N is written into any FIFO cell 19.00-19.F when no selection of a key K.0-K.11 is sensed during the corresponding timing window Tw.0-Tw.N.

When the first device determines in step 18.16 that the FIFO variable has been incremented to be greater than or equal to the last cell address of 19.F, the first device 6 proceeds from step 18.16 to step 18.20 and to write the value contents of the FIFO 19 in the sequence of generation into a pattern fraction message PFM.N. The pattern fragment message PFM.N generated in step 18.20, and generated in accordance with the message format of FIG. 16, is transmitted by the first device 6 via the network 2 to the server 12.

The first device 6 determines in step 18.24 whether to continue to monitor the key pad 35A for additional generation of values for the FIFO 19, and proceeds onto execute step 18.10 when the first device 6 determines to continue generation of pattern fractions PF.N. When the first device 6 determines in step 18.24 to not\ continue to monitor the key pad 35A for additional generation of values for the FIFO 19, the first device proceeds on to step 18.08 and to proceed to perform additional computational operations.

Referring now generally to the Figures and particularly to FIG. 19, FIG. 19 is a schematic illustration of the account database 65. The plurality of account records AR.1-AR.N may include a reference REF.1-REF.N, a device address CALL.1-CALL.N, a device identifier, a telephone number, an identity information AR.1.IN-AR.N.IN, a user name for Twitter™ social media service, a small message service address, and/or additional account information. The additional account information might include billing information and/or credit charge account numbers associated with a user or owner of a device 4 or 6 or system 5, 9, 12, or 13.

Figure 20:
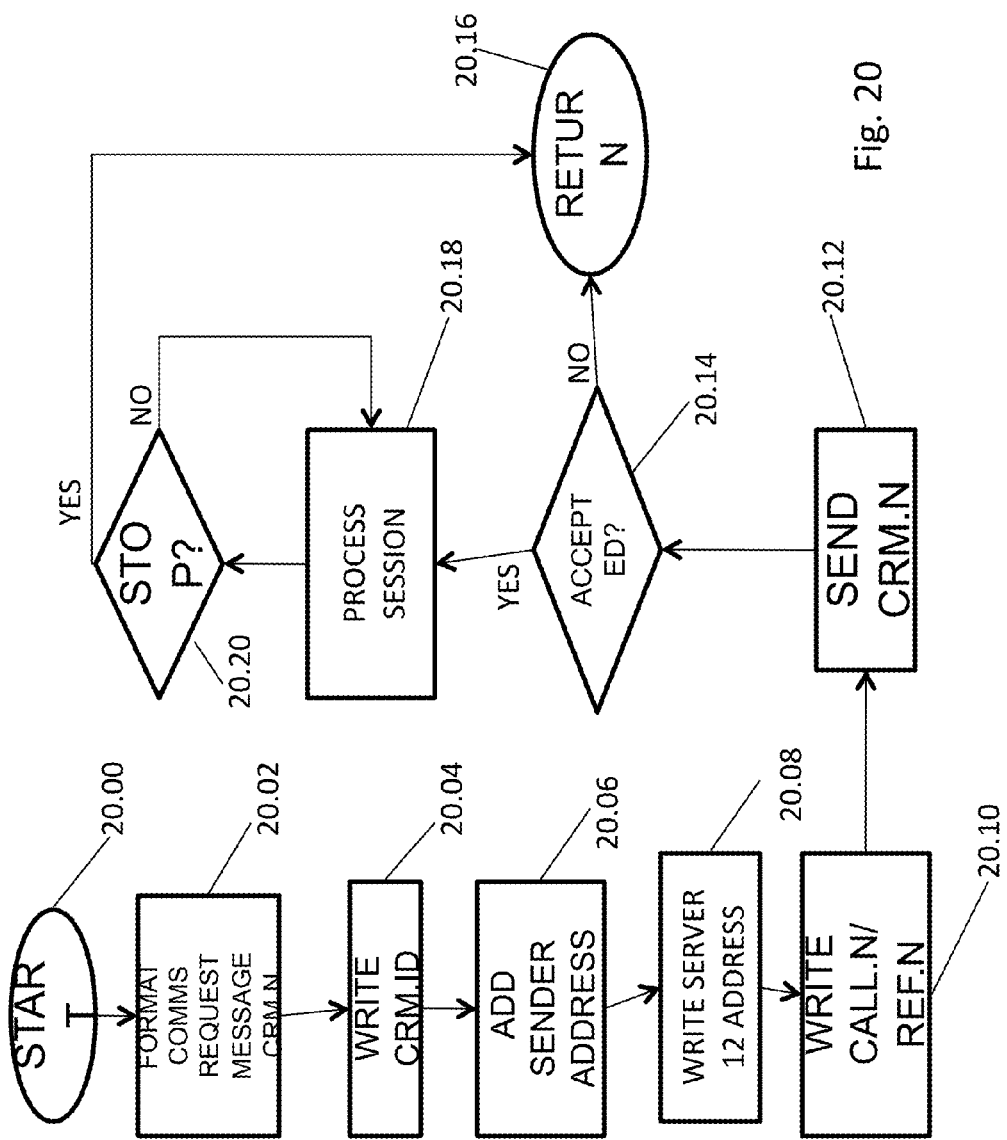
FIG. 20 is a flowchart of a process of the first device of FIGS. 1, 2 and 4 wherein a communication session request message is generated and sent to the server of FIGS. 1, 3 and 5 via the network of FIG. 1.

Referring now generally to the Figures and particularly to FIG. 20, FIG. 20 is a flowchart of a process of the first device 4 wherein a communication session request message CRM.N is generated and sent to the server 12 via the network 2. In step 20.02 a communication session request message CRM.N is initiated by the first device 4. In step 20.04 a CRM message identifier CRM.N.ID is generated and written into the communication session request message CRM.N. In step 20.06 the network address of the first device 4 is written into the communication session request message CRM.N. In step 20.08 the network address of the server 12 is written into the communication session request message CRM.N as a message destination address. In step 20.10 a device address CALL.2-CALL.N associated with a device 6 or system 5, 9, 12 or 13 in an account record AR.2-AR.N may be written into the communication session request message CRM.N. Additionally, alternatively or optionally in step 20.10 a reference REF.2-REF.N associated with a device 6 or system 5, 9, 12 or 13 in an account record AR.2-AR.N may be written into the communication session request message CRM.N. The communication session request message CRM.N is transmitted to the server 12 in step 20.12.

The first device 4 determines in step 20.14 whether the first device 4 has received an indication via the server 12 or network 2 that that a device 6 or system 5, 9, 12 or 13 referenced in the communication session request message CRM.N transmitted in step 20.12 has been accepted, i.e., the referenced device 6 or system 5, 9, 12, or 13 has issued a message indicating a willingness to engage in a communications session with the first device 4. When the first device 4 determines in step 20.14 that the first device 4 has not received an indication via the server 12 or network 2 that that a device 6 or system 5, 9, 12 or 13 agrees to engage in a communications session, the first device proceeds on to step 20.16 and to perform additional computational operations.

Alternatively, when the first device 4 determines in step 20.14 that the first device 4 has received an indication via the server 12 or network 2 that that a device 6 or system 5, 9, 12 or 13 agrees to engage in a communications session, the first device 4 engages in the requested communications session in step 20.20. It is understood that the communications session of step 20.20 may be or include a telephone call, a VoIP session, an email exchange, an SMS process, a social media communication (s), and/or an avatar represented process.

When the first device determines in step 20.20 to cease the communications session of step 20.18, the first device 4 proceeds from step 20.20 to step 20.16 and to perform additional computational operations.

Figure 21:
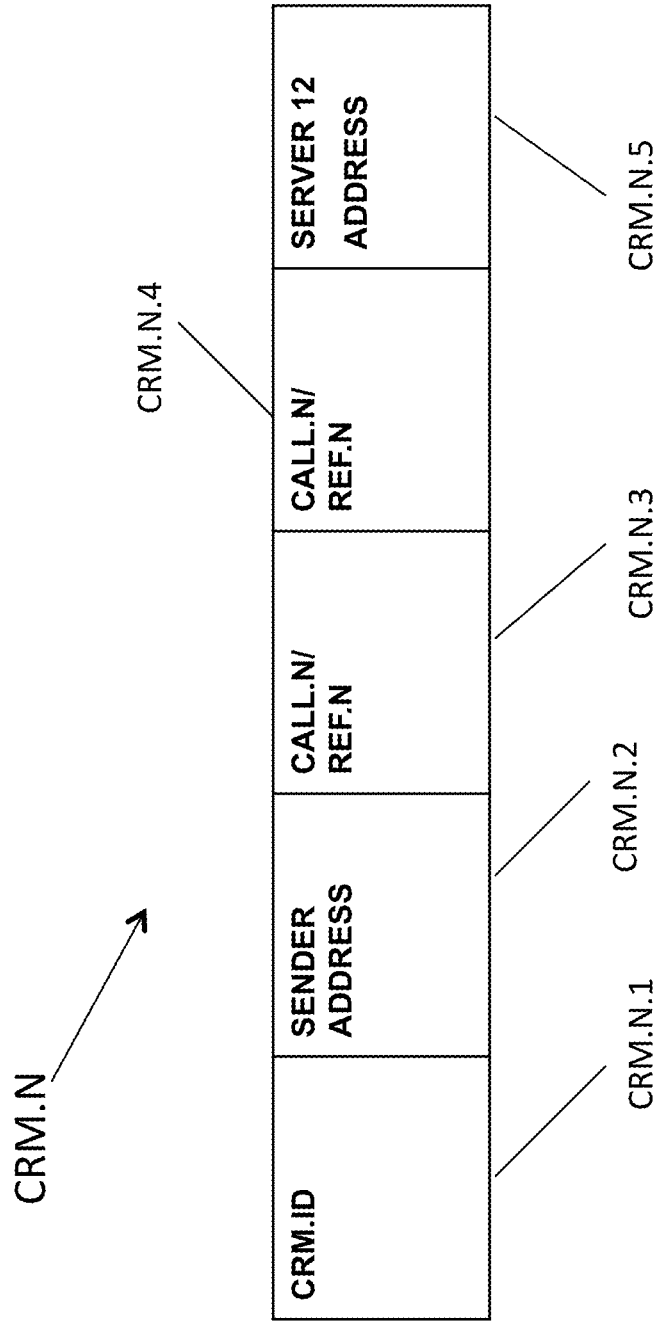
FIG. 21 is an illustration of the format and contents of a communication session request message of FIG. 20.

Referring now generally to the Figures and particularly to FIG. 21, FIG. 21 is an illustration of the format and contents of a communication session request message CRM.N as generated and transmitted by the first device 4, the second device 6, and/or a system 5, 9, or 13 of the network 2. A first CRM data field CRM.N.1 includes a CRM message identifier CRM.ID. A network address of the sender, e.g., the first device 4, of the comprising communication session request message CRM.N is stored in a second CRM message data field CRM.N.2. A third communication session request message data field CRM.N.3 includes the device address CALL.N and/or the reference REF.N associated in the account database 65 with the sending device 4 or 6 or system 5, 9, 12, or 13. A fourth CRM data field CRM.N.4 includes the device address CALL.N and/or the reference REF.N associated a device 6 or system 5, 9, 12, 13 with which the first party wishes to establish a communications session. A fourth CRM data field CRM.N.4 includes a network address NT.SERV of the server 12 as the addressee of the communication session request message CRM.N.

Figure 22:
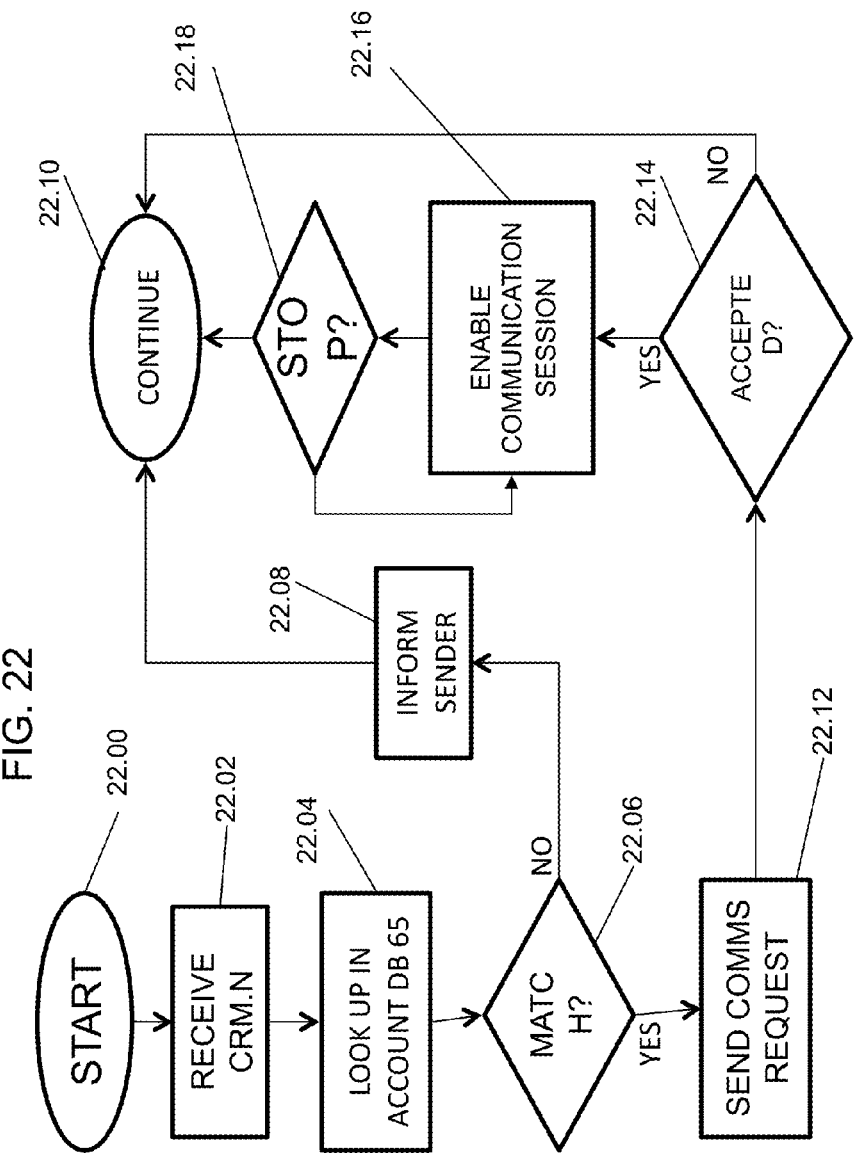
FIG. 22 is a flow chart of a process of the server of FIGS. 1, 3 and 5 wherein a communication session request message of FIGS. 20 and 21 is received and processed.

Referring now generally to the Figures and particularly to FIG. 22, FIG. 22 is a flow chart of a process of the server 12 wherein a communication session request message CRM.N of FIGS. 20 and 21 is received and processed. The communication session request message CRM.N is received in step 22.02. The device address CALL.N and/or the reference REF.N of the fourth CRM data field CRM.N.4 received in step 22.02 are applied to the account data base 65 in step 22.04. The server 12 determines in step 22.06 whether an account record AR.N of the account data base includes an association between the device address CALL.N and/or the reference REF.N of the fourth CRM data field and a device 4 or 6 or a system 5, 9, 12 or 13.

When the server 12 determines in step 22.06 that no account record AR.N of the account data base includes an association between the device address CALL.N and/or the reference REF.N of the fourth CRM data field and a device 4 or 6 or a system 5, 9, 12 or 13, the server 12 proceeds on to step 22.08 and to inform the device 4 or 6 or system 9, 12 or 13 identified as the sender of the communication session request message CRM.N received in step 22.02 that of this failure to find lack of association. The server 12 proceeds form step 22.08 to step 22.10 to perform additional computational tasks.

When the server 12 determines in step 22.06 that at least one account record AR.N of the account data base includes an association between the device address CALL.N and/or the reference REF.N of the fourth CRM data field and a device 4 or 6 or a system 5, 9, 12 or 13, the server 12 sends a communications request to the associated device 6 or system 5, 9, 12 or 13 and determines whether the communications request has been accepted in step 22.14. When the server 12 determines in step 22.14 that the communications request of step 22.12 has been accepted in step 22.14, the server 12 proceeds to enable a communications session in step 22.18 until the session is stopped by one or more devices 4 or 6 or systems 5, 9, 12, 13 as per step 22.18.

It is understood that the server 12 may to provide separate telephone numbers for the first device 4 and the second device 6 to the telecom server 9 and direct the telecom server 9 to enable the communications session in step 22.18.

The server 12 proceeds from step 22.18 to step 22.10 to perform additional computational tasks when the server determines in step 22.18 that one or more devices 4 or 6 or systems 5, 9, 12, 13 has ceased participation in the communications session of step 22.16. It is understood that the communications session of step 22.16 may be or include a telephone call, a VoIP session, an email exchange, an SMS process, a social media communication (s), and/or an avatar represented process.

Figure 23:
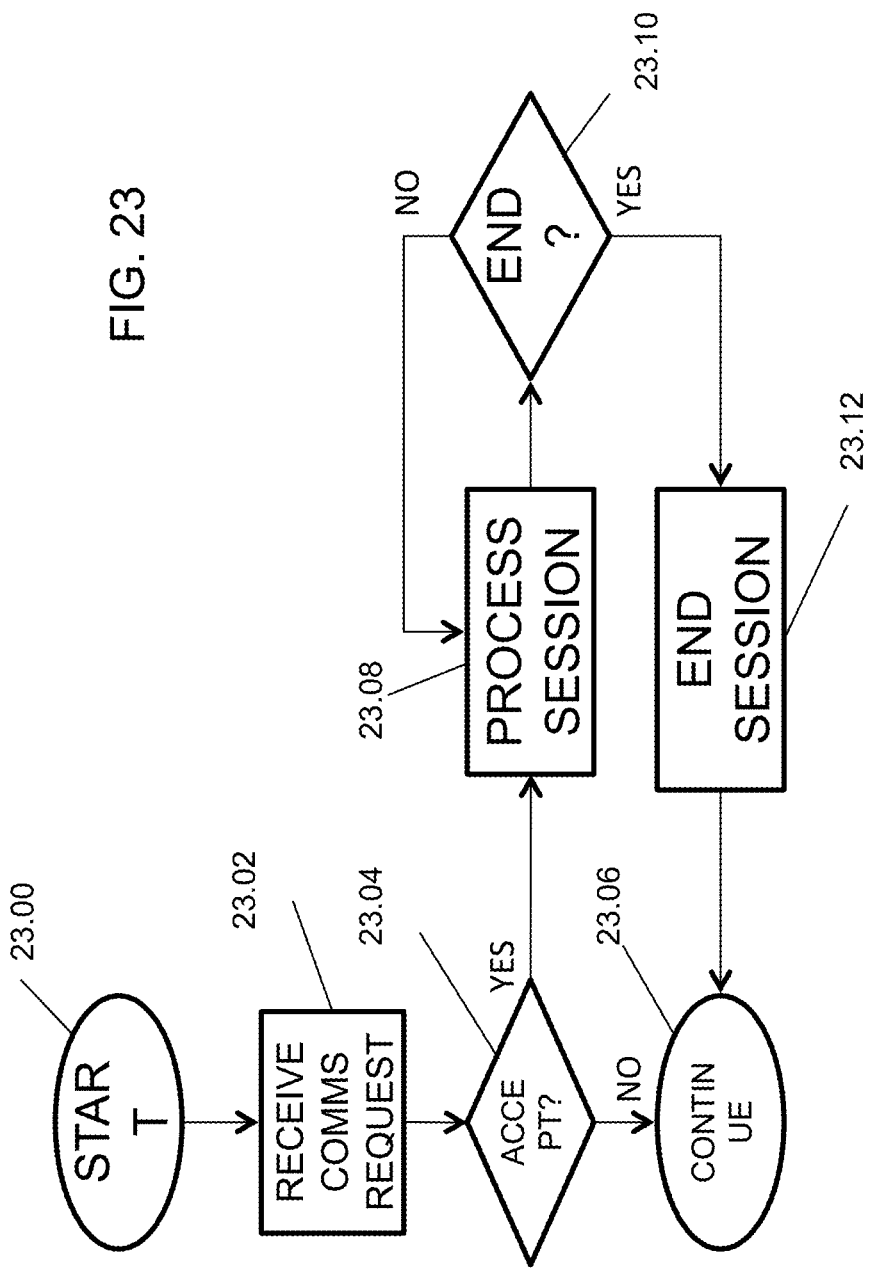
FIG. 23 is a flowchart of a process of the first device of FIGS. 1, 2 and 4 wherein a communications request message of FIGS. 21 and 22 is received from the server of FIGS. 1, 3 and 5.

Referring now generally to the Figures and particularly to FIG. 23, FIG. 23 is a flowchart of a process of the first device 4 wherein a communications request message is received from the server 12 in step 23.02. The first party may respond in step 23.04 to direct the first device 4 to decline the communications request in step 23.04 by means of the input device 42 or the audio input device 44, whereupon the first device 4 will proceed from step 23.04 to step 23.06 and to perform alternate computational operations.

Alternatively, the first party may respond in step 23.04 to direct the first device 4 to accept the communications request in step 23.04 by means of the input device 42 or the audio input device 44, whereupon the first device 4 will proceed from step 23.04 to step 23.08 and process a communication session. The first device 4 will enable the communications session of step 23.08 until the first device 4 determines in step 23.10 to end the communications session of step 23.08. When the first device 4 determines in step 23.10 to end the communications session of step 23.08, the first device proceeds to step 22.12 and ends the communications session, and proceeds on to step 23.06 and to perform alternate computational operations.

It is understood that the communications session of step 23.08 may be or include a telephone call, a VoIP session, an email exchange, an SMS process, a social media communication (s), and/or an avatar represented process.

Figure 24:
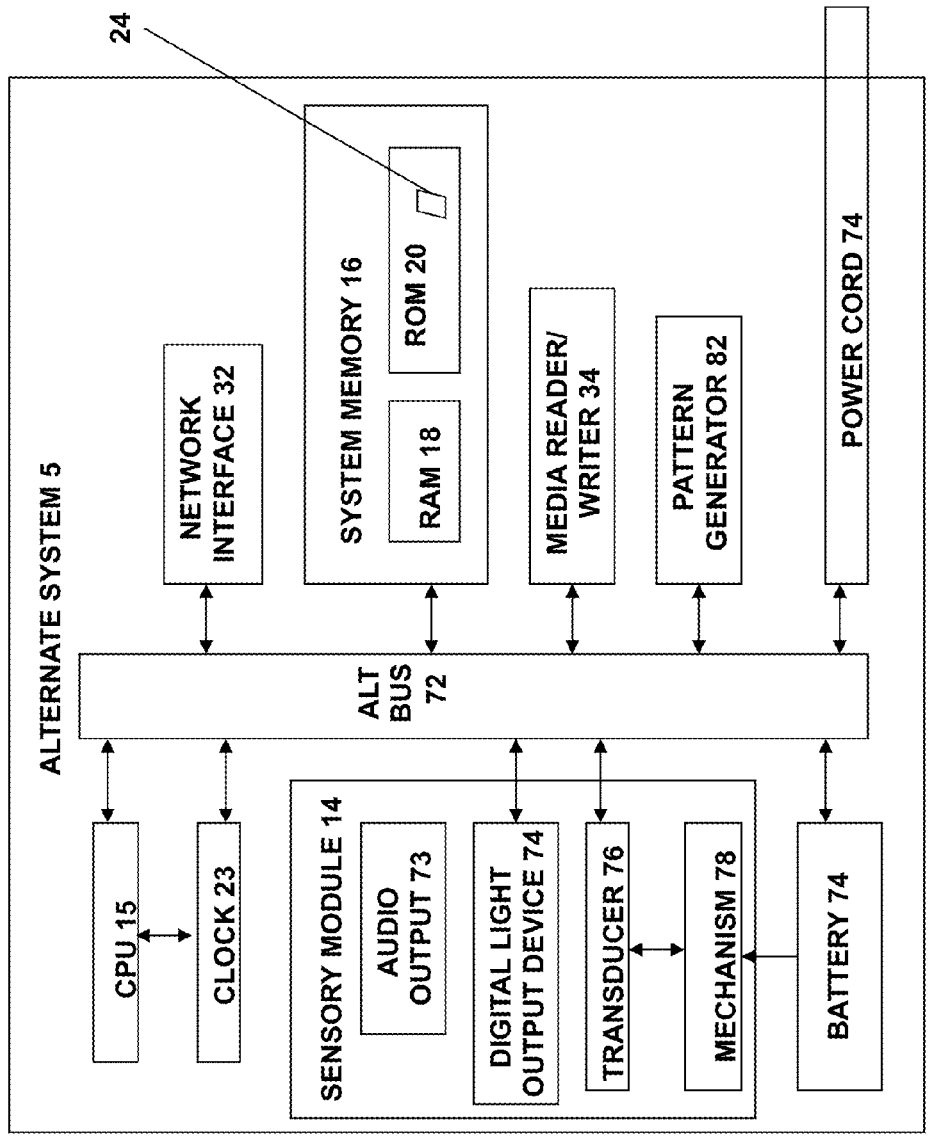
FIG. 24 is a schematic diagram of the alternate system of FIGS. 1, 2 and 4.

Referring now generally to the Figures and particularly to FIG. 24, FIG. 24 is a schematic diagram of the alternate system 5. It is understood that in accordance with the method of the present invention these alternate system 5 may optionally, additionally or alternatively include one or more aspects or elements of the device 4 or the server 12 as disclosed FIGS. 2 through 5 and elsewhere within the present invention. An alternate power and communications bus 72 (or "alternate bus" 72) provides electrical power received from a battery 74 and/or a power cord 74 of an external power source to the elements 14 through 82 of the alternate system 5. The alternate power and communications bus 72 further bi-directionally couples the CPU 15 and the server real time clock 23B with the video interface 38, the network interface 32, the system memory 16, the media reader writer 34, the pattern generator 82 and the sensory module 14. The sensory module 14 receives the generated pattern PI.4.A via the alternate bus 72. An audio output devices 73 of the sensory module 14 is configured to derive an audio signal from the generated pattern PI.4.A and to emit sound or music in sync with the derived audio signal. A digital light device 74 of the sensory module 14 is configured to derive a timed light pattern the generated pattern PI.4.A and to emit light in sync with the timed light pattern. A transducer 76 of the sensory module 14 is configured to derive a motion pattern the generated pattern PI.4.A and to direct a mechanical mechanism 78 to exhibit movement in sync with the derived motion pattern.

It is understood that optionally, alternatively or additionally the pattern generator 82 may (1.) receive the generated pattern PI.4.A from the network 2, the network interface 34 and/or the computer-readable media 30; (2.) store the generated pattern PI.4.A; and (3.) provide the generated pattern PI.4.A to the sensory module 14 via the alternate bus 72.

Alternatively or optionally the alternate system 5 may essentially comprise (1.) a sensory output device, e.g., the audio output device 73, the digital light device 74 and/or the transducer 76 and the mechanical mechanism 78; (2.) a power source, e.g., the battery 74 or an electrical power feed delivered through the power cord 74; and (3.) the pattern generator 82. The pattern generator 82 may be coupled to one or more sensory output devices 73, 74, 76 and provide the generated pattern PI.4.A to the one or more sensory output devices 73, 74, 76, wherein the pattern generator 82 and the one or more sensory output devices 73, 74, 76 are powered by the power source.

Figure 25:
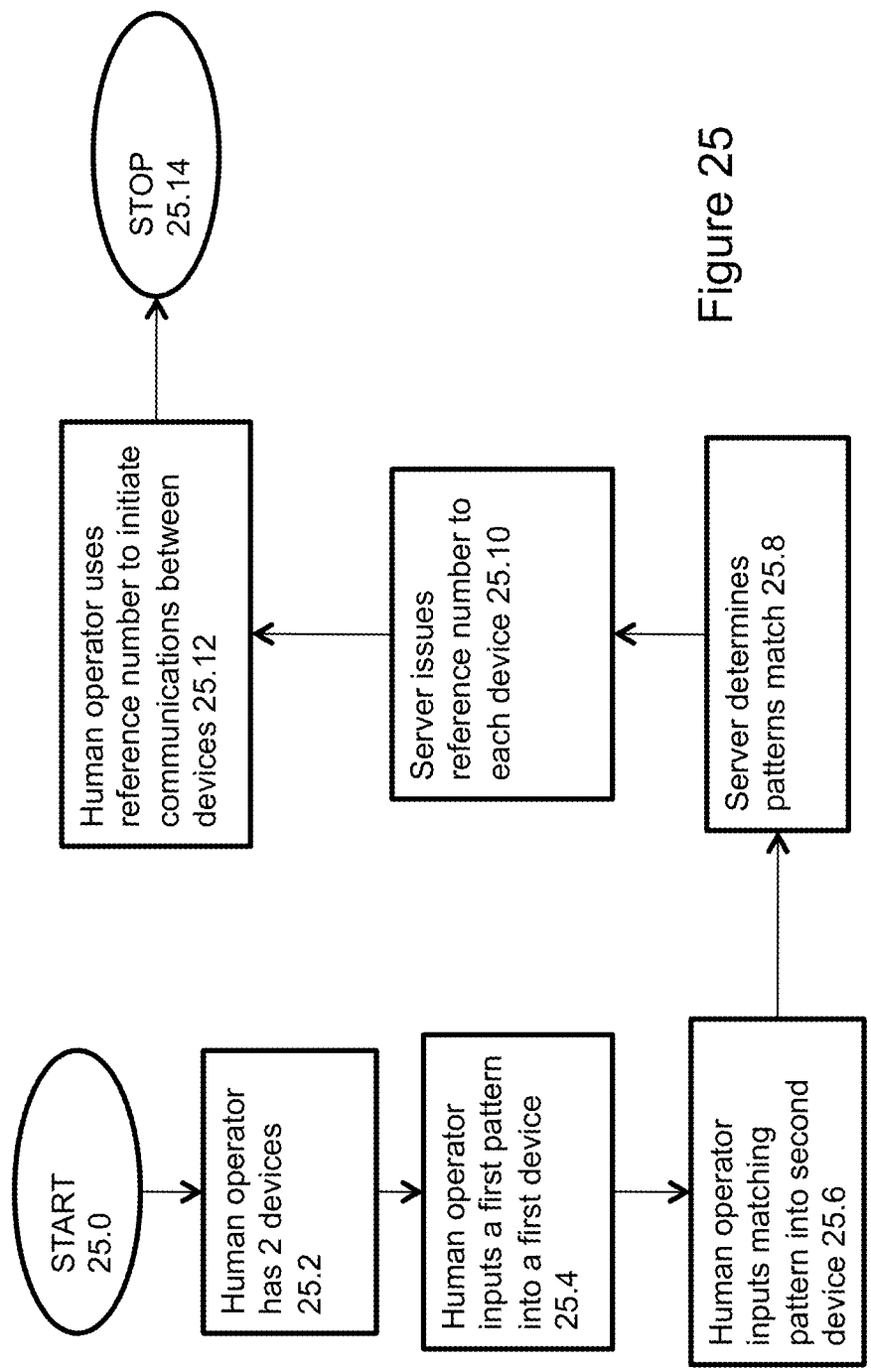
FIG. 25 is a flow chart depicting the method of a single human operator in possession of a first device and a second device that the user wishes to communicatively associate and connect.

Referring now to FIG. 25, FIG. 25 is a flow chart depicting the method of a single human operator in possession of a first device 4, 5 or 13 and a second device 5, 6 or 13 that the user wishes to communicatively connect. In step 25.2 a human operator ("operator") secures and/or is provided operational access to the first device 4, 5 or 13 and the second device 5, 6 or 13. The operator inputs a first pattern into the first device 4, 5 or 13 in step 25.4, and inputs a second pattern into the second device in step 25.6. It is understood that steps 25.4 and 25.6 may start, occur, be performed and/or be completed simultaneously, or within one minute of each other, or within five minutes of each other, or be performed at a time differential greater than five minutes.

These first device 4, 5, or 13 or second devices 5, 6 or 13 may consist of a mobile phone, a computer, a client website, or an electronic device that can wirelessly communicate over an electronic communications network and receive tactile, auditory, or visual input. In connecting the two devices 4, 5, 6 or 13, the devices 4, 5, 6 or 13 can be of differing types such that a phone may connect to a computer or a phone may connect to another electronic communications enabled device. In use the single human operator inputs a first pattern into the first device 4, 5, 13 then a substantively similar second pattern into a second device 5, 6, 13. In certain alternate preferred embodiments of the method of the present the second pattern is input to the second device 5, 6, or 13 preferably within one minute of the input of the first pattern into the first device 4, 6 or 13. Alternatively or additionally, the second pattern is input to the second device 5, 6, or 13 preferably simultaneously or within ten seconds of the input of the first pattern into the first device 4, 6 or 13.

It is understood that the first pattern and/or the second pattern may be or include an sound energy pattern, an audible pattern, a visual pattern and/or a tactile pattern. It is understood that the first pattern and/or the second pattern may be input be user selections of an icon as rendered on a touch screen of the first device 4, 5 or 13 and/or the second device 5, 6 or 13.

The first pattern and the second pattern are transmitted to a central server 12 respectively in steps 25.4 and 25.6. The server 12 receives digitized representations of the first pattern and the second pattern in step 25.8, and also analyzes the patterns and determine if they are substantively similar in the same process step 25.8. When a determination that the first pattern and the second pattern are substantively similar is made, the server 12 will creates a reference number REF.1-REF.N that is associated with the separate network addresses CALL.1-CALL.N of each of the two devices 4, 5, 6 or 13 in step 25.10. In step 25.12 the server 12 attempts to establish a communications session between first device 4, 5 or 13 and the second device 5, 6 or 13 when the server 12 receives a communications request message CRM.N that includes the reference number.

It is understood that either or both of the separate network addresses CALL.1-CALL.N may be or comprise a telephone number, a voice over network input address, an Internet Protocol address, a universal resource locator, and an email address.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

I claim:

1. In an electronics communications network comprising a server, a first communications device having a first network address and a second communications device having a second network address, a method for enabling an anonymous communications session, the method comprising:
   a. receiving a first input pattern by the server from the first communications device ("first device");
   b. receiving a second input pattern by the server from the second communications device ("second device");
   c. determining whether the first input pattern substantively matches the second input pattern;
   d. issuing a reference number when the first input pattern substantively matches the second input pattern;
   e. associating the first network address and the second network address with the reference number;
   f. receiving the reference number from the first device; and
   g. communicatively connecting the first device to the second device regardless of the operating state or connecting state of the first device.

2. The method of claim 1, wherein the first device is a mobile phone and the second device is a network-enabled device, and the second device renders a webpage, wherein the user inputs the second input pattern in interaction with the webpage.

3. The method of claim 1, wherein the first device is a mobile phone and the second device presents a button as an input key, whereby the user inputs the first input pattern by means of a keypad of the first device and inputs the second input pattern by means of the button.

4. The method of claim 1, wherein the first device presents a first button as a first device input key and the second device presents a second button as a second device input key, whereby the user inputs the first input pattern by means of the first button of the first device and inputs the second input pattern by means of the second button of the second device.

5. The method of claim 1, further comprising initiating a communications session between the first device and the second device.

6. The method of claim 1, wherein the first network address is selected from the address group essentially consisting of a telephone number, a voice over network input address, an Internet Protocol address, a universal resource locator, and an email address.

7. The method of claim 1, wherein the second network address is selected from the address group essentially consisting of a telephone number, a voice over network input address, an Internet Protocol address, a universal resource locator, and an email address.

8. The method of claim 1, wherein the first device is selected from the device group essentially consisting of a telephone, a digital telephone, a cellular telephone, a network appliance, a wireless communications device and a network enabled personal digital assistant.

9. The method of claim 1, wherein the second device is selected from the device group essentially consisting of a telephone, a digital telephone, a cellular telephone, a network appliance, a wireless communications device and a network enabled personal digital assistant.

10. The method of claim 1, wherein the first pattern is selected from the sensory mode group of an audible pattern, a visual pattern and a tactile pattern.

11. The method of claim 1, wherein the first pattern is transmitted to the server by depressing a button of the first device.

12. The method of claim 1, wherein the second pattern is transmitted to the server by selecting a button of the second device.

13. The method of claim 1, wherein the server ceases to initiate a communications session after a time T has elapsed after the issuance of the reference number.

14. The method of claim 1, further comprising:
   receiving by the server the reference number transmitted from a third communications device (third device);
   initiating a communications session request to the second device; receiving by the server an acceptance of the communications session request transmitted from the second device; and
   initiating a communications session between the third device and the second device.

15. In an electronics communications network comprising a server, a first communications device having a first network address and a second communications device having a second network address, a method for enabling an anonymous communications session, the method comprising:
   a. receiving a first input pattern by the server from the first communications device ("first device");
   b. receiving a second input pattern by the server from the second communications device ("second device");
   c. determining whether the first input pattern matches the second input pattern;
   d. issuing a reference number when the first input pattern matches the second input pattern;
   e. associating the first network address and the second network address with the reference number;
   f. transmitting the reference number to the first device;
   g. receiving by the server the reference number transmitted from the first device;
   h. initiating a communications session request to the second device;
   i. receiving by the server an acceptance of the communications session request transmitted from the second device; and
   j. initiating a communications sentence between the first device and the second device regardless of the operating state or connecting state of the first device.

16. The method of claim 15, wherein the first network address is selected from the address group essentially consisting of a telephone number, a voice over input address, an Internet Protocol address, a universal resource locator, and an email address.

17. The method of claim 15, wherein the first device is selected from the device group essentially consisting of a telephone, a digital telephone, a cellular telephone, a network appliance, a wireless communications device and a network enabled personal digital assistant.

18. The method of claim 17, wherein the first network address is selected from the address group essentially consisting of a telephone number, a voice over input address, an Internet Protocol address, a universal resource locator, and an email address.

19. The method of claim 15, wherein the first pattern is selected from the sensory mode group of an audible pattern, a visual pattern and a tactile pattern.

20. The method of claim 15, wherein the first pattern is transmitted to the server by selecting a rendered icon of a display screen of the first device.

* * * * *